(12) United States Patent
Lu et al.

(10) Patent No.: US 12,185,369 B2
(45) Date of Patent: *Dec. 31, 2024

(54) ENHANCED HIGH-THROUGHPUT MULTI-LINK CHANNEL ACCESS AND OPERATION

(71) Applicant: MediaTek Singapore Pte. Ltd., Singapore (SG)

(72) Inventors: Kaiying Lu, San Jose, CA (US); Yongho Seok, San Jose, CA (US); James Chih-Shi Yee, San Jose, CA (US); Chao-Chun Wang, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,085

(22) Filed: Oct. 24, 2022

(65) Prior Publication Data

US 2023/0043239 A1   Feb. 9, 2023

Related U.S. Application Data

(63) Continuation of application No. 17/010,137, filed on Sep. 2, 2020, now Pat. No. 11,516,841.

(60) Provisional application No. 62/933,581, filed on Nov. 11, 2019, provisional application No. 62/896,630, filed on Sep. 6, 2019.

(51) Int. Cl.
*H04W 74/08* (2024.01)
*H04W 76/15* (2018.01)

(52) U.S. Cl.
CPC .......... *H04W 74/08* (2013.01); *H04W 76/15* (2018.02)

(58) Field of Classification Search
CPC .............. H04W 74/08; H04W 74/002; H04W 84/12; H04W 76/15; H04W 52/0216
See application file for complete search history.

(56) References Cited

U.S. PATENT DOCUMENTS

2016/0157266 A1   6/2016  Wang et al.
2016/0323881 A1*  11/2016  Bhora ...................... H04L 1/00
(Continued)

FOREIGN PATENT DOCUMENTS

CN           109417755 A        3/2019

OTHER PUBLICATIONS

China National Intellectual Property Administration, First Office Action in China Patent Application No. 202011244642.8, Apr. 29, 2023.

(Continued)

*Primary Examiner* — Quoc Thai N Vu
(74) *Attorney, Agent, or Firm* — Andy M. Han; Han IP PLLC

(57) ABSTRACT

An apparatus (e.g., an access point (AP)) establishes a plurality of links comprising a primary link and at least a secondary link. The apparatus transmits a management frame on the primary link to indicate a multi-link capability of the AP. The apparatus configures the secondary link for one or more non-AP stations (STAs), which are capable of operating on the primary link and the secondary link, with multi-link capability and operating parameters through an association procedure on the primary link.

18 Claims, 24 Drawing Sheets

(56) References Cited

U.S. PATENT DOCUMENTS

| | | |
|---|---|---|
| 2018/0205502 A1* | 7/2018 | Merlin .................. H04W 76/15 |
| 2019/0150214 A1 | 5/2019 | Zhou et al. |
| 2019/0268956 A1* | 8/2019 | Xiao ................... H04W 40/244 |
| 2020/0014599 A1 | 1/2020 | Asterjadhi et al. |
| 2021/0195622 A1* | 6/2021 | Kim .................. H04W 72/0453 |
| 2021/0243756 A1 | 8/2021 | Kim et al. |
| 2021/0360522 A1* | 11/2021 | Chitrakar .......... H04W 52/0206 |

OTHER PUBLICATIONS

European Patent Office, European Search Report regarding European Patent Application No. 20194637.3, Dec. 15, 2020.
United States Patent & Trademark Office, Office Action for U.S. Appl. No. 17/010,137, filed Feb. 16, 2022.

\* cited by examiner

| Trigger Type Subfield Value | Trigger Frame Variant |
|---|---|
| 0 | Basic |
| 1 | Beamforming Report Poll (BFRP) |
| ... | ... |
| 8 | Multi-Link Trigger |
| 9 ~ 15 | Reserved |

Trigger Type Subfield Encoding

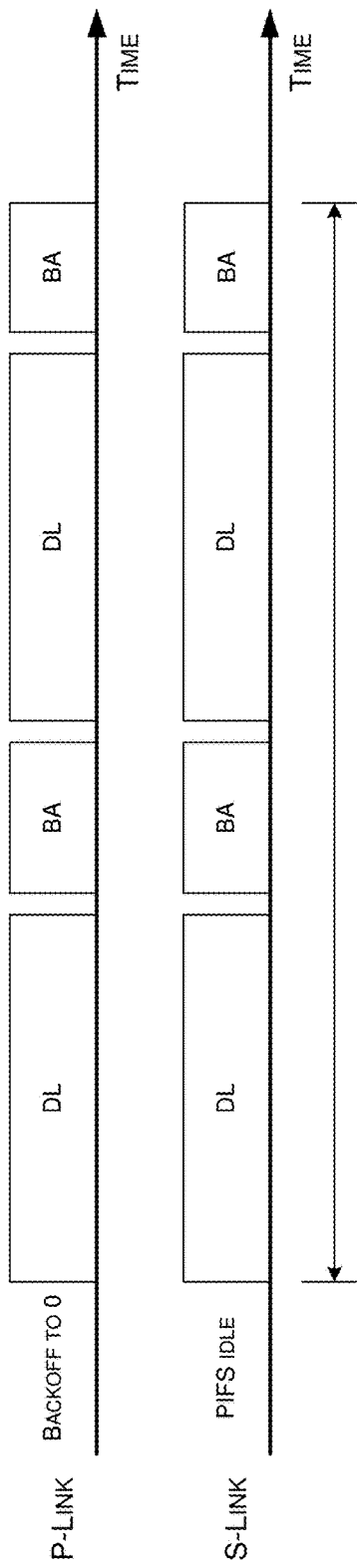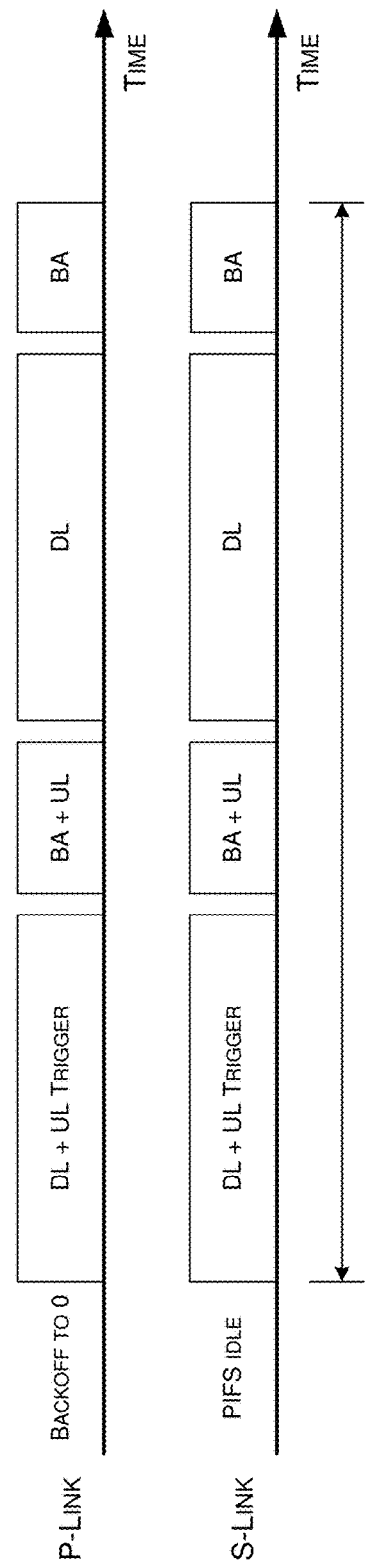
FIG. 11

2400

RECEIVE, BY AN APPARATUS IMPLEMENTED IN A STATION (STA), A MANAGEMENT FRAME FROM AN ACCESS POINT (AP) ON A PRIMARY LINK OF A PLURALITY OF LINKS COMPRISING THE PRIMARY LINK AND AT LEAST A SECONDARY LINK, THE MANAGEMENT FRAME INDICATING A MULTI-LINK CAPABILITY OF THE AP
2410

PERFORM, BY THE APPARATUS, AN ASSOCIATION PROCEDURE ON THE PRIMARY LINK
2420

RECEIVE, BY THE APPARATUS WHICH IS CAPABLE OF OPERATING ON THE PRIMARY LINK AND THE SECONDARY LINK, A SETUP CONFIGURATION ON THE PRIMARY LINK FROM THE AP SETTING UP THE SECONDARY LINK
2430

FIG. 24

ENHANCED HIGH-THROUGHPUT MULTI-LINK CHANNEL ACCESS AND OPERATION

CROSS REFERENCE TO RELATED PATENT APPLICATION

The present disclosure is part of a Continuation of U.S. patent application Ser. No. 17/010,137, filed 2 Sep. 2020 and claiming the priority benefit of U.S. Provisional Patent Application Nos. 62/896,630 and 62/933,581, filed 6 Sep. 2019 and 11 Nov. 2019, respectively. Contents of aforementioned applications are herein incorporated by reference in their entirety.

TECHNICAL FIELD

The present disclosure is generally related to wireless communications and, more particularly, to enhanced high-throughput (EHT) multi-link channel access and operation.

BACKGROUND

Unless otherwise indicated herein, approaches described in this section are not prior art to the claims listed below and are not admitted as prior art by inclusion in this section.

In a wireless local area network (WLAN), a station (STA) capable of a multi-link transmission needs to access any of the multiple links whenever one or more of the multiple links is/are available in order to meet EHT project authorization request (PAR) with respect to Institute of Electrical and Electronics Engineers (IEEE) 802.11 standard(s). In an event that an access point (AP) capable of multi-link operation has constraints on receiving and transmitting frames simultaneously in multiple links due to in-device coexistence (IDC) interference (e.g., between the 5 GHz and 6 GHz frequency bands), multi-link capability might not be utilized efficiently because of the IDC interference. For instance, in case the AP is performing frame exchange with one or more STAs on one link, then other associated STAs should not transmit on another link even though the channel is idle for those STAs; otherwise the AP might suffer IDC interference. One way to address this issue might be to force STAs which detected frame exchange(s) from its own basic service set (BSS) on one link to suspend backoff or perform internal collision resolution on the other link which has IDC constraints with the ongoing transmission link. However, this would result in inefficient utilization of multi-link resources. Therefore, there remains a need for a solution for avoiding the IDC interference issue while efficiently utilizing multi-link resources without forcing STAs to suspend backoff or perform internal collision resolution for channel access on links with constraints.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT multi-link channel access and operation. Under various proposed schemes in accordance with the present disclosure, it is believed that the IDC interference issue may be avoided while multi-link resources may be efficiently utilized without forcing STAs to suspend backoff or perform internal collision resolution for channel access on links with constraints.

In one aspect, a method may involve a processor of an apparatus implemented in an AP establishing a plurality of links comprising a primary link and at least a secondary link. The method may also involve the processor transmitting a management frame on the primary link to indicate a multi-link capability of the AP. The method may further involve the processor configuring the secondary link for one or more non-AP stations (STAs), which are capable of operating on the primary link and the secondary link, with multi-link capability and operating parameters through an association procedure on the primary link.

In another aspect, a method may involve a processor of an apparatus implemented in a STA receiving a management frame from an AP on a primary link of a plurality of links comprising the primary link and at least a secondary link, with the management frame indicating a multi-link capability of the AP, which is capable of operating on the primary link and the secondary link. The method may also involve the processor performing an association process on the primary link. The method may further involve the processor receiving a setup configuration on the primary link from the AP setting up the secondary link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6 is a diagram of an example scenario in accordance with the present disclosure.

FIG. 11 is a diagram of an example scenario in accordance with the present disclosure.

FIG. 24 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT multi-link channel access and operation in wireless communications. According to the present disclosure, a number of possible solutions may be implemented separately or jointly. That is, although these possible solutions may be described below separately, two or more of these possible solutions may be implemented in one combination or another.

Figure 1:
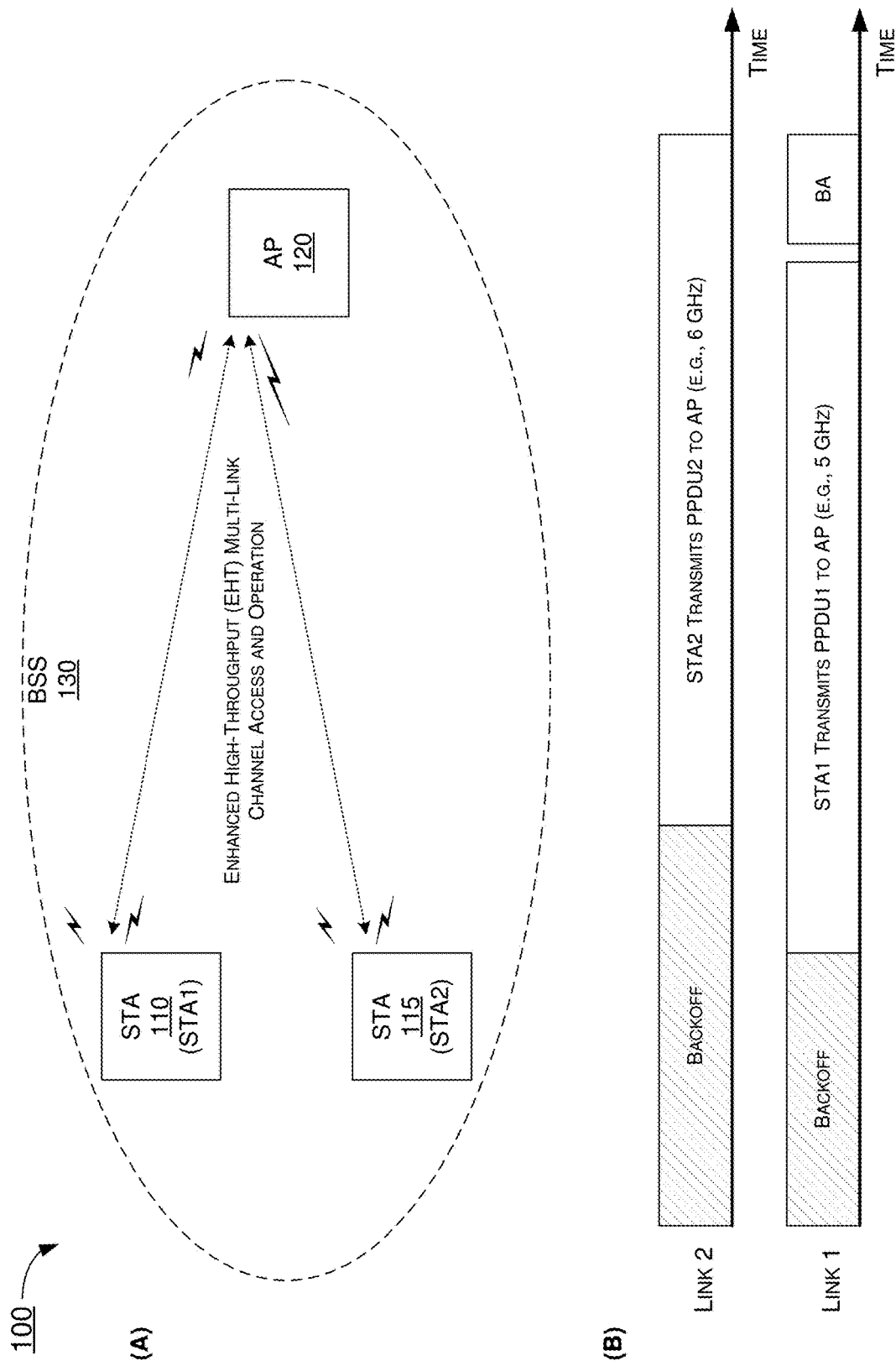
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 21 illustrate examples of implementation of various proposed schemes in network environment 100 in accordance with the present disclosure. The following description of various proposed schemes is provided with reference to FIG. 1~FIG. 21.

Referring to part (A) of FIG. 1, network environment 100 may involve at least a STA 110 and a STA 115 that are associated with, and communicating wirelessly with, an AP 120 in a BSS 130 in accordance with one or more IEEE 802.11 standards. Each of STA 110 (herein interchangeably denoted as "STA1") and STA 115 (herein interchangeably denoted as "STA2") may be a multi-link STA with one or more links (e.g., link 1 and link 2) operating in, for example and without limitation, the 2.4 GHz band, 5 GHz-band and/or 6 GHz band. Similarly, AP 120 may be multi-link capable and thus may communicate with STA 110 and/or STA 115 over one or more links (e.g., link 1 and link 2). Under various proposed schemes in accordance with the present disclosure, STA 110, STA 115 and AP 120 may be configured to perform EHT multi-link channel access and operation in wireless communications in accordance with various proposed schemes described below.

Referring to part (B) of FIG. 1, suppose that link 1 and link 2 have IDC interference, when STA 110 obtains channel or transmit opportunities (TXOPs) on link 1, STA 110 may transmit frames to AP 120 on the obtained channel/TXOPs over link 1. STA 115 may still contend in other link(s) (e.g., link 2) in order to meet low-latency requirement(s) in transmission. When STA 115 obtains channel or TXOPs on link 2, STA 115 may transmit frames to AP 120 on the obtained channel/TXOPs over link 2. However, in case AP 120 has constraints on receiving and transmitting frames simultaneously on multiple links (e.g., link 1 and link 2) due to IDC interference (e.g., in 5 GHz and 6 GHz frequency bands), an aggregate Medium Access Control (MAC) Protocol Data Unit (A-MPDU) or Physical Layer Conformance Procedure (PLCP) Protocol Data Unit (PPDU) transmitted by STA 115 might not be received correctly by AP 120 due to the IDC interference in an even that AP 120 needs to provide feedback block acknowledgement (BA) to STA 110 on link 1.

As explained further below, under one or more of the various proposed schemes in accordance with the present disclosure with respect to EHT multi-link channel access and operation, a multi-link capable AP (e.g., AP 120) with constraints on simultaneous transmission and reception (TX/RX) on different links may follow certain rules. For instance, AP 120 may set up BSS 130 and transmit management frames (e.g., beacons, probe response) on a primary link to indicate multi-link capability of AP 120 to STAs (e.g., STA 110 and STA 115) of BSS 130. AP120 may allow legacy STAs and EHT STAs not capable of multi-link operation to be associated with the AP only on the primary link but not on the secondary link. AP 120 may also configure one or more secondary links to be enabled for trigger-based UL transmissions and disabled for enhanced distributed channel access (EDCA) UL transmissions. Additionally, a TXOP initiated on the primary link (herein interchangeably referred as "triggering TXOP") may trigger a TXOP on the secondary link (herein interchangeably referred as "triggered TXOP"). Moreover, the triggering TXOP and the triggered TXOP may be synchronized. Furthermore, an end point of the triggered TXOP on the secondary link may be restricted by an end point of the triggering TXOP on the primary link.

As explained further below, under one or more of the various proposed schemes in accordance with the present disclosure with respect to EHT multi-link channel access and operation, a multi-link capable non-AP STA (e.g., STA 110 or STA 115) with constraints on simultaneous TX/RX on different links may follow certain rules. For instance, STA 110/STA 115 may only contend the medium on the primary link. Additionally, STA 110/STA 115 may monitor configured secondary link(s) for a trigger frame. Moreover, STA 110/STA 115 may request to be triggered on the configured secondary link(s). Furthermore, STA 110/STA 115 may not respond to trigger frames addressed to it on the secondary link(s) unless it has performed clear channel assessment (CCA) until a frame is detected by which STA 110/STA 115 may set its network allocation vector (NAV), or until a period equal to a predefined delay has transpired, whichever is earlier.

Under a proposed scheme in accordance with the present disclosure, AP 120 may set up a primary link and one or more secondary links among the multiple links. For instance, AP 120 may transmit management frames (e.g., beacons) and other management frames on the primary link. Moreover, AP 120 may configure the secondary link(s) for its associated STAs, including STA 110 and STA 115, with capability and operating parameters of the multiple links through the primary link. Additionally, AP 120 may transmit short beacons, each with a time stamp and BSS identifier information, on the secondary link(s).

Under the proposed scheme, in case AP 120 cannot support simultaneous transmission and reception on the primary link and at least one secondary link respectively, AP 120 may indicate in the configuration for the secondary link the following: (a) UL trigger-based channel access is enabled, and (b) distributed coordination function (DCF) and/or EDCA contention-based UL channel access is disabled. For instance, AP 120 may configure the secondary link for UL transmission to be trigger-based only, and there would be no channel contention allowed on this secondary link. Additionally, AP 120 may trigger its associated STAs, including STA 110 and STA 115, to perform UL transmission on the secondary link by at least one of several ways. A first way would involve AP 120 directly contending a medium on the secondary link(s) for transmitting a UL trigger frame. A second way would involve initiation by an associated STA (e.g., STA 110 or STA 115) through a trigger request indication (e.g., reverse-direction exchange indication) in an ongoing PPDU on the primary link. A third way would involve multi-link acknowledgement with trigger information or BA plus multi-trigger by AP 120 on the primary link or on both the primary link and the secondary link(s).

Under a proposed scheme in accordance with the present disclosure, the associated STAs (e.g., STA 110 and STA 115) with multi-link capability may park on the primary link. For instance, a given non-AP STA (e.g., of STA 110 or STA 115) may be associated with AP 120 through the primary link and may indicate its multi-link capability. The primary link to the non-AP STA may be the link where the non-AP STA is associated with AP 120 or parked on. The non-AP STA may support multiple radios or a single radio. Moreover, the non-AP STA may support simultaneous transmission and reception or not.

Under the proposed scheme, a given non-AP STA (e.g., STA 110 or STA 115) may be configured with one or more secondary links through the primary link. For instance, for each secondary link, the non-AP STA may be configured for UL channel access as either trigger-based channel access only or contention-based channel access only, or both. In case AP 120 cannot accommodate simultaneous transmission and reception on the primary link and a specific secondary link, then that specific secondary link may be configured for UL channel access as trigger-based only. There may be no restriction on channel access method on the primary link for the non-AP STA unless the channel access policy is explicitly indicated.

Under the proposed scheme, a given non-AP STA (e.g., STA 110 or STA 115) may contend the medium for channel access on the primary link and/or the secondary link(s) which are not indicated as trigger-based UL only. Moreover, in case a secondary link is indicated as trigger-based UL only, the non-AP STA may monitor the trigger frame or trigger information on the primary link and/or the secondary link for the non-AP STA to transmit UL data on the secondary link. For instance, the non-AP STA with multiple radios may only perform CCA detection on the secondary link(s) for NAV setting and resetting on that link without trying to decode the packet in an even that: (a) AP 120 indicates that the trigger frame or trigger information will be sent only on the primary link, or (b) the non-AP STA indicates to enter low power mode (e.g., by keeping primary link fully on while only performing CCA detection for secondary link(s)). Furthermore, the non-AP STA with multiple radios may keep monitoring the primary link to decode the packet including trigger information.

Under a proposed scheme in accordance with the present disclosure, an ongoing TXOP of intra-BSS frame exchange on the primary link may trigger a secondary TXOP on the secondary link(s). Under the proposed scheme, the ongoing TXOP of intra-BSS frame exchange may be initiated by either AP 120 or a non-AP STA (e.g., STA 110 or STA 115). Under the proposed scheme, when the TXOP initiator is a non-AP STA, one or more of a number of operations may be carried out separately or in combination. In one of the operations, the TXOP initiator (e.g., STA 110 or STA 115) may indicate the grant (e.g., link identifier (ID) bitmap) for AP 120 to trigger the TXOP initiating entity and/or other non-AP STA(s) for UL transmissions on the primary link and/or the secondary link(s). For instance, the TXOP initiator may indicate its buffer status for one or more traffic IDs (TIDs) for traffic flows, bandwidth requirements, and preferred/available link IDs. In another one of the operations, the TXOP responder (e.g., AP 120) may respond to the TXOP initiator with acknowledgement, trigger information and/or information with or without the TXOP initiator's grant. For instance, AP 120 may trigger one or more non-AP STAs for UL transmission on the primary link and/or the secondary link(s). Moreover, the trigger or trigger information may be sent on the primary link or both the primary link and the secondary link(s). Under the proposed scheme, the trigger indication may be indicate one or more of the following pieces of information: (a) a link ID for one or more specific non-AP STAs to monitor the trigger on the specific link, (b) a target time for one or more specific non-AP STAs to receive the trigger, and (c) resource scheduling information and/or transmission parameter(s).

Figure 2:
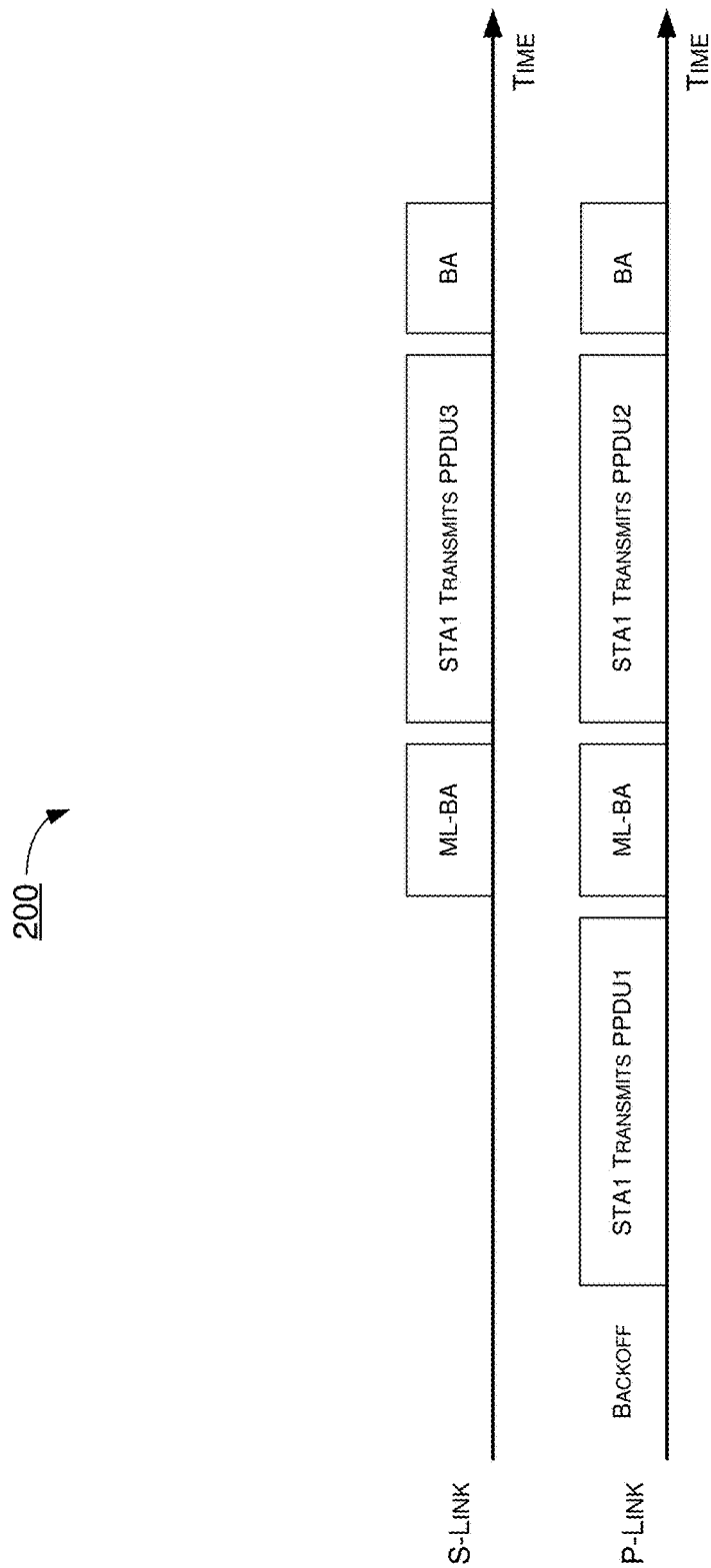
FIG. 2 is a diagram of an example scenario in accordance with the present disclosure.

FIG. 2 illustrates an example scenario 200 in accordance with an implementation of the present disclosure. In scenario 200, STA 110 (denoted as "STA1" in FIG. 2), as a TXOP initiator, may transmit a first PPDU (denoted as "PPDU1" in FIG. 2) indicating a grant for AP 120 to trigger STA 110 (and, optionally, STA 115) for UL transmissions on either or both of a primary link (denoted as "P-Link" in FIG. 2) and a secondary link (denoted as "S-Link" in FIG. 2). In response, AP 120 may transmit a multi-link block acknowledgement (ML-BA) on both the primary link and the secondary link to solicit synchronous UL transmissions on the P-Link and the S-Link in response to receiving the first PPDU. Accordingly, STA 110 may transmit a second PPDU (denoted as "PPDU2" in FIG. 2) on the primary link and a third PPDU (denoted as "PPDU3" in FIG. 2) on the secondary link. Upon receiving PPDU2 and PPDU3, AP 120 may transmit a BA on each of the primary link and secondary link.

Under the proposed scheme, when the TXOP initiator is AP 120, the TXOP initiator may trigger one or more TXOP responders (e.g., STA 110 and/or STA 115) for UL transmissions on the primary link and/or the secondary link(s). For instance, the trigger or trigger information may be sent on the primary link to trigger non-AP STAs to transmit on the secondary link. Alternatively, or additionally, the trigger or trigger information may be sent on the primary link to indicate one or more intended non-AP STAs to receive trigger on the secondary link.

Under the proposed scheme, a TXOP responder (e.g., STA 110 or STA 115) may respond to the TXOP initiator with UL trigger-based PPDU on the primary link and request for a trigger on the secondary link(s). For instance, the TXOP responder may not respond to trigger frames addressed to it on the secondary link(s) unless the TXOP responder has performed CCA until a frame is detected by which the TXOP responder can set its NAV, or until a period equal to a predefined delay has transpired, whichever is earlier.

Figure 3:
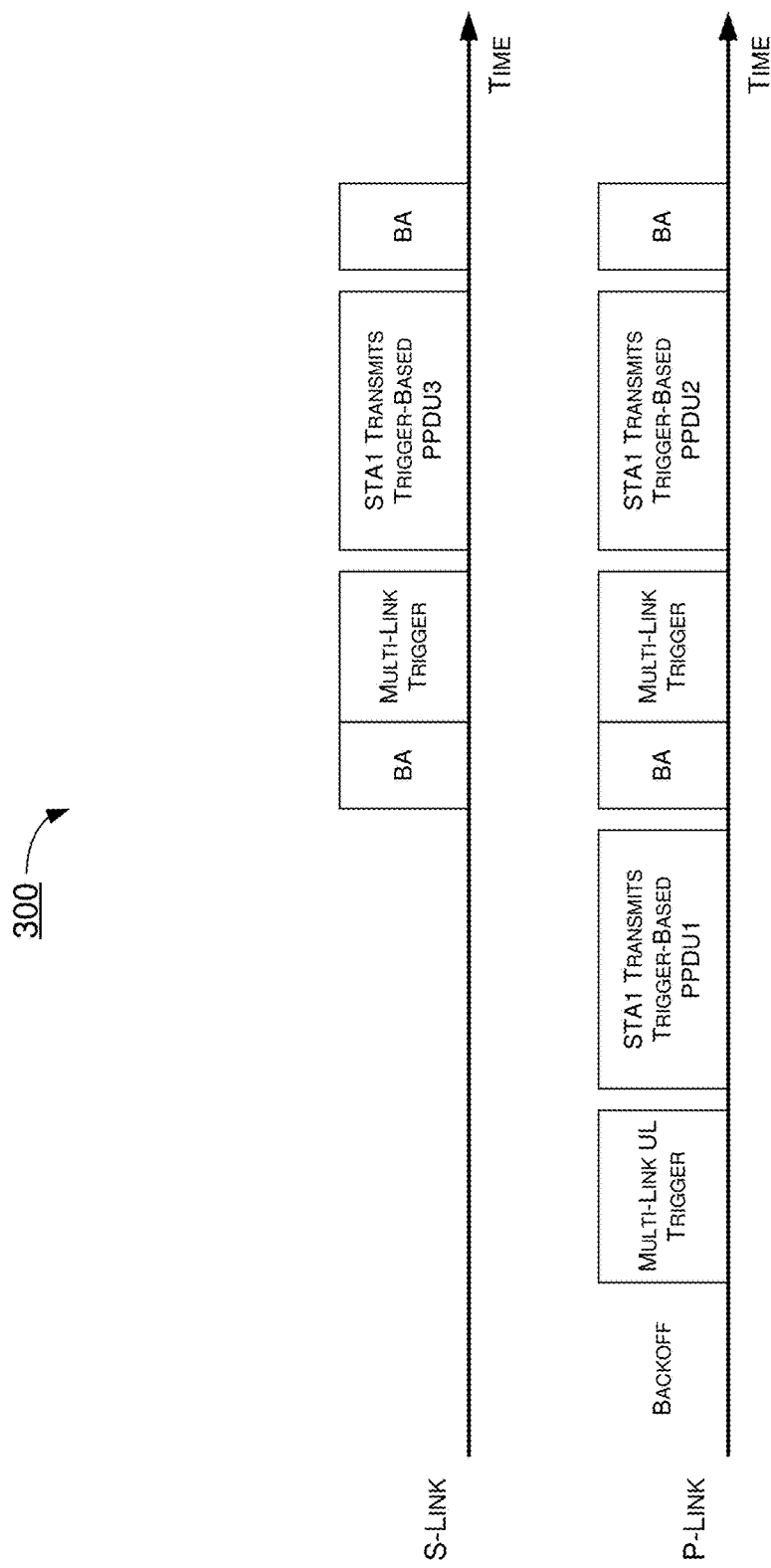
FIG. 3 is a diagram of an example scenario in accordance with the present disclosure.

FIG. 3 illustrates an example scenario 300 in accordance with an implementation of the present disclosure. In scenario 300, STA 110 (denoted as "STA1" in FIG. 3), as a TXOP responder, may receive a multi-link UL trigger from AP 120 as a TXOP initiator. Accordingly, STA 110 may transmit a trigger-based first PPDU (denoted as "PPDU1" in FIG. 3) on a primary link (denoted as "P-Link" in FIG. 3) and a BA followed by a multi-link trigger on each of the primary link and a secondary link (denoted as "S-Link" in FIG. 3). In response, STA 110 may transmit a trigger-based second PPDU (denoted as "PPDU2" in FIG. 3) on the primary link and a trigger-based third PPDU (denoted as "PPDU3" in FIG. 3) on the secondary link. Upon receiving PPDU2 and PPDU3, AP 120 may transmit a BA on each of the primary link and secondary link.

Under a proposed scheme in accordance with the present disclosure, an end point of a triggered TXOP on a secondary link may coincide or be earlier in time than an end point of a triggering TXOP on the primary link. Under the proposed scheme, both the triggering TXOP and the triggered TXOP may be synchronized within a duration of the triggering TXOP. For instance, the PPDUs on the primary link and the secondary link may be aligned within the duration of the triggering TXOP. Moreover, simultaneous transmission and reception on the primary link and the secondary link may be supported. Furthermore, there may be no point coordination function (PCF) inter-frame space (PIFS) recovery transmission on the secondary link.

Figure 4:
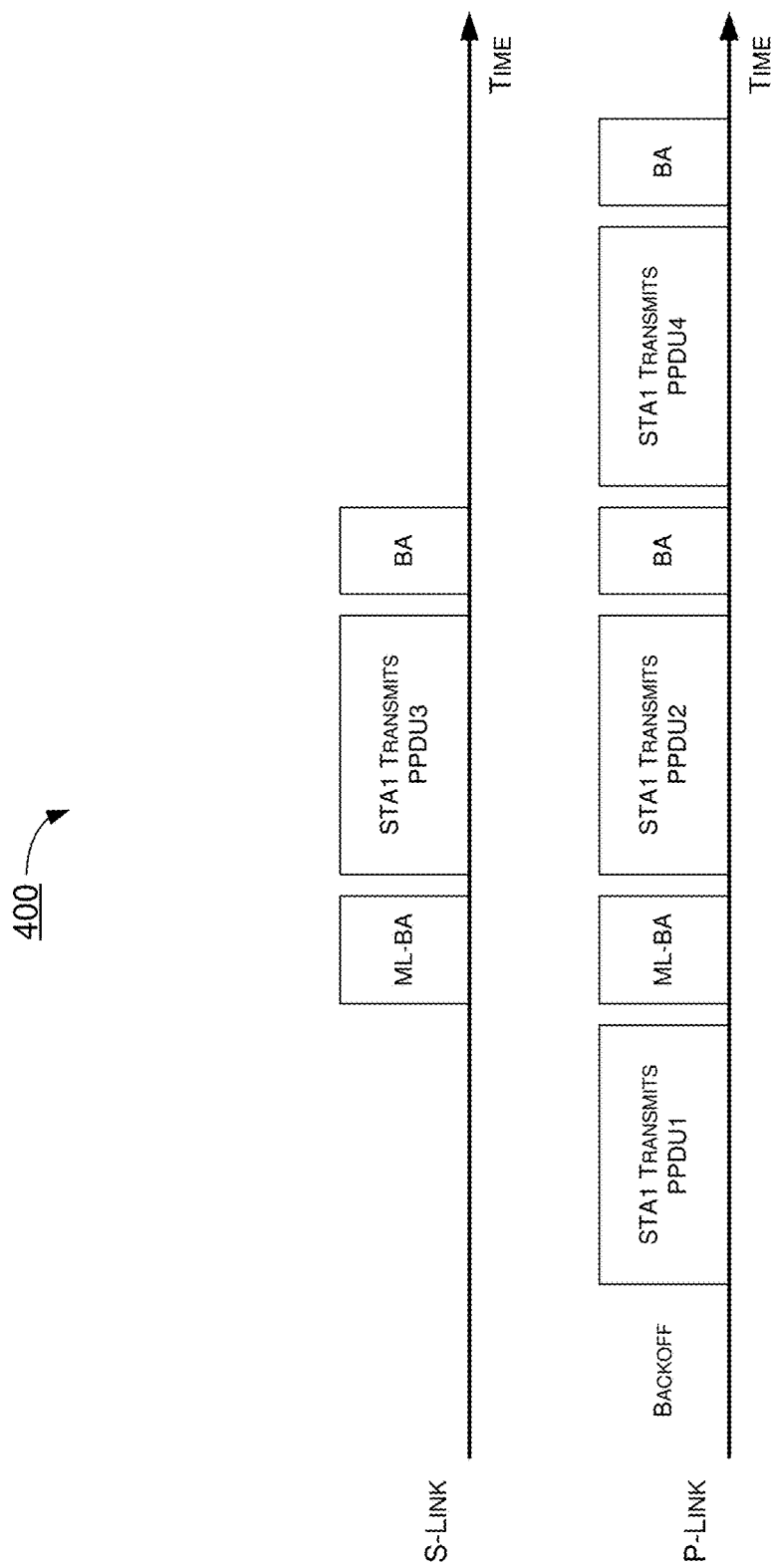
FIG. 4 is a diagram of an example scenario in accordance with the present disclosure.

FIG. 4 illustrates an example scenario 400 in accordance with an implementation of the present disclosure. In scenario 400, STA 110 (denoted as "STA1" in FIG. 4) may transmit a first PPDU (denoted as "PPDU1" in FIG. 4) indicating a grant for AP 120 to trigger STA 110 (and, optionally, STA 115) for UL transmissions on either or both of a primary link (denoted as "P-Link" in FIG. 4) and a secondary link (denoted as "S-Link" in FIG. 4). In response, AP 120 may transmit a control frame (e.g., ML-BA) on both the primary link and the secondary link to solicit synchronous UL transmissions on the P-Link and the S-Link in response to receiving the first PPDU. Accordingly, STA 110 may transmit a second PPDU (denoted as "PPDU2" in FIG. 4) on the primary link and a third PPDU (denoted as "PPDU3" in FIG. 4) on the secondary link. Upon receiving PPDU2 and PPDU3, AP 120 may transmit a BA on each of the primary link and secondary link. Moreover, STA 110 may transmit a fourth PPDU (denoted as "PPDU4" in FIG. 4) on the primary link, which may be followed by a BA from AP 120 on the primary link. In scenario 400, the triggered TXOP on the secondary link and the triggering TXOP on the primary link may be synchronized and both may end at the same time.

Figure 5:
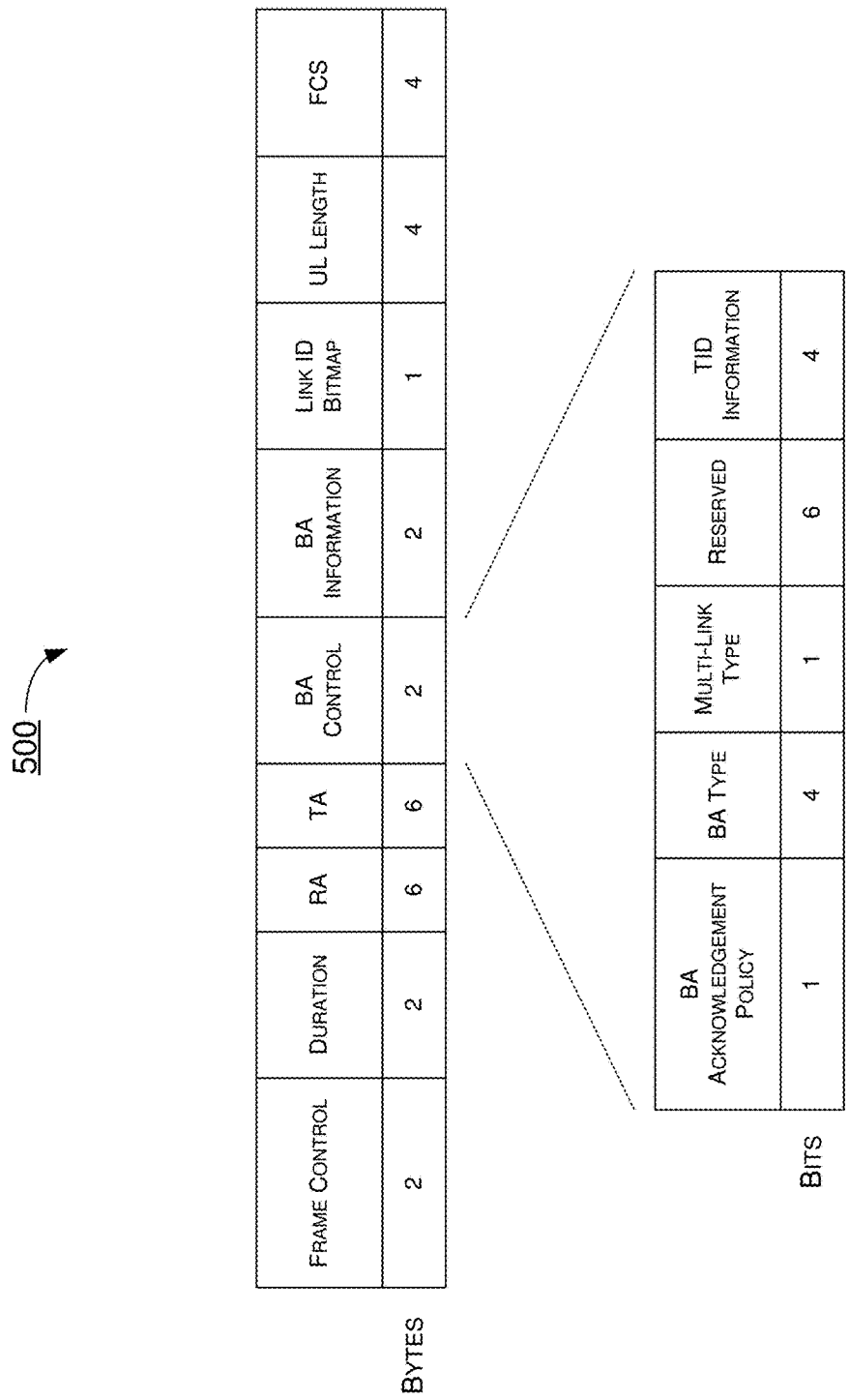
FIG. 5 is a diagram of an example format in accordance with the present disclosure.

Under a proposed scheme in accordance with the present disclosure, a ML-BA may be in one of a number of possible formats. FIG. 5 illustrates an example format 500 (not to scale) in accordance with an implementation of the present disclosure. Referring to FIG. 5, in a first option (option 1), the ML-BA may include a link ID bitmap. Additionally, a Multi-Link Type bit in a BA control field may indicate the ML-BA. Moreover, a Link ID Bitmap field with a value of "1" on the corresponding bit may indicate the link to be triggered (and a value of "0" may indicate the link to be not triggered). Furthermore, an UL PPDU Length field may indicate a length of the next trigger-based PPDU.

FIG. 6 illustrates an example scenario 600 in accordance with an implementation of the present disclosure. Referring to FIG. 6, in a second option (option 2), a BA or acknowledgement (ACK) may be concatenated with a Multi-Link Trigger variant. For instance, the Trigger Type may be Multi-Link Trigger. Additionally, the Multi-Link Trigger may contain a Link ID Bitmap indicating which link of multiple links is to be triggered. Moreover, the Multi-Link Trigger may contain a common PPDU length scheduled for the next PPDU on multiple links. Furthermore, the BA/ACK and Multi-Link Trigger may be aggregated in one A-MPDU.

Figure 7:
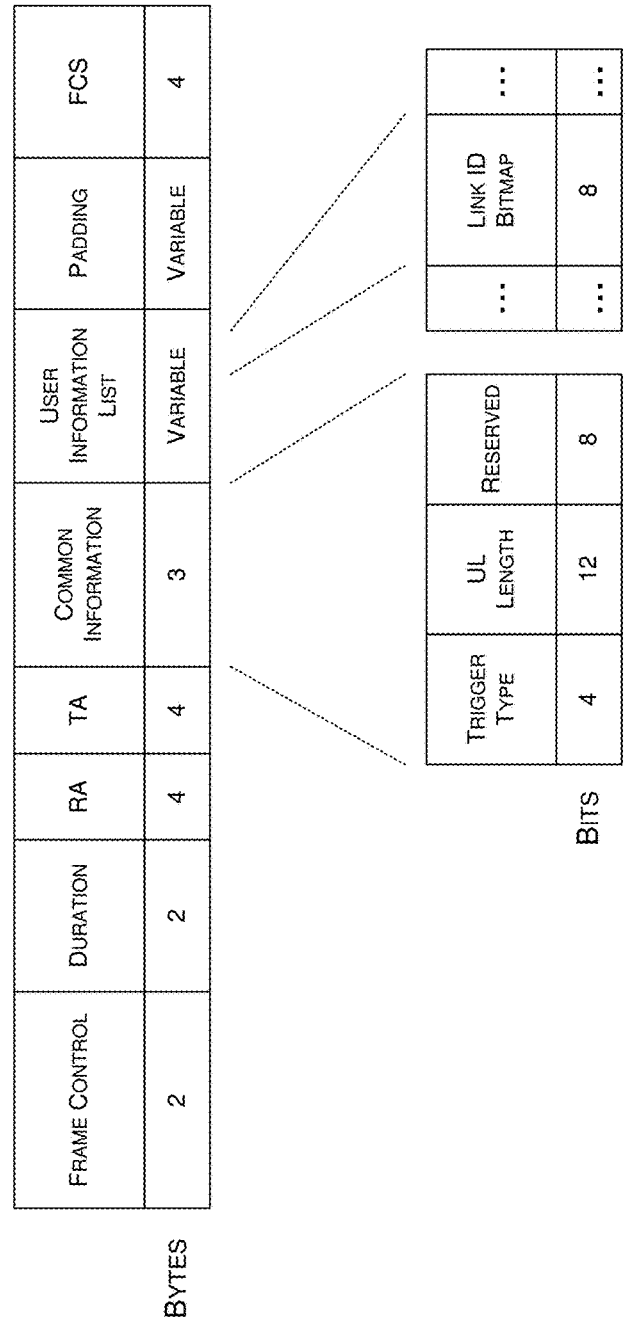
FIG. 7 is a diagram of an example format in accordance with the present disclosure.

FIG. 7 illustrates an example format 700 (not to scale) in accordance with an implementation of the present disclosure. Referring to FIG. 7, in the second option (option 2), a Duration field may be set per link and a receiver address (RA) field may be set as the MAC address of a recipient per link. Additionally, a transmitter address (TA) may be the MAC address of a STA transmitting the trigger frame. Moreover, a Common Information field may contain a Trigger Type subfield and a UL Length subfield. For instance, the UL length in the Common Information field of the trigger frame may contain the common PPDU length for subsequent PPDUs. Furthermore, a User Information field may contain at least a Link ID Bitmap indicating the link(s) to be triggered.

Figure 8:
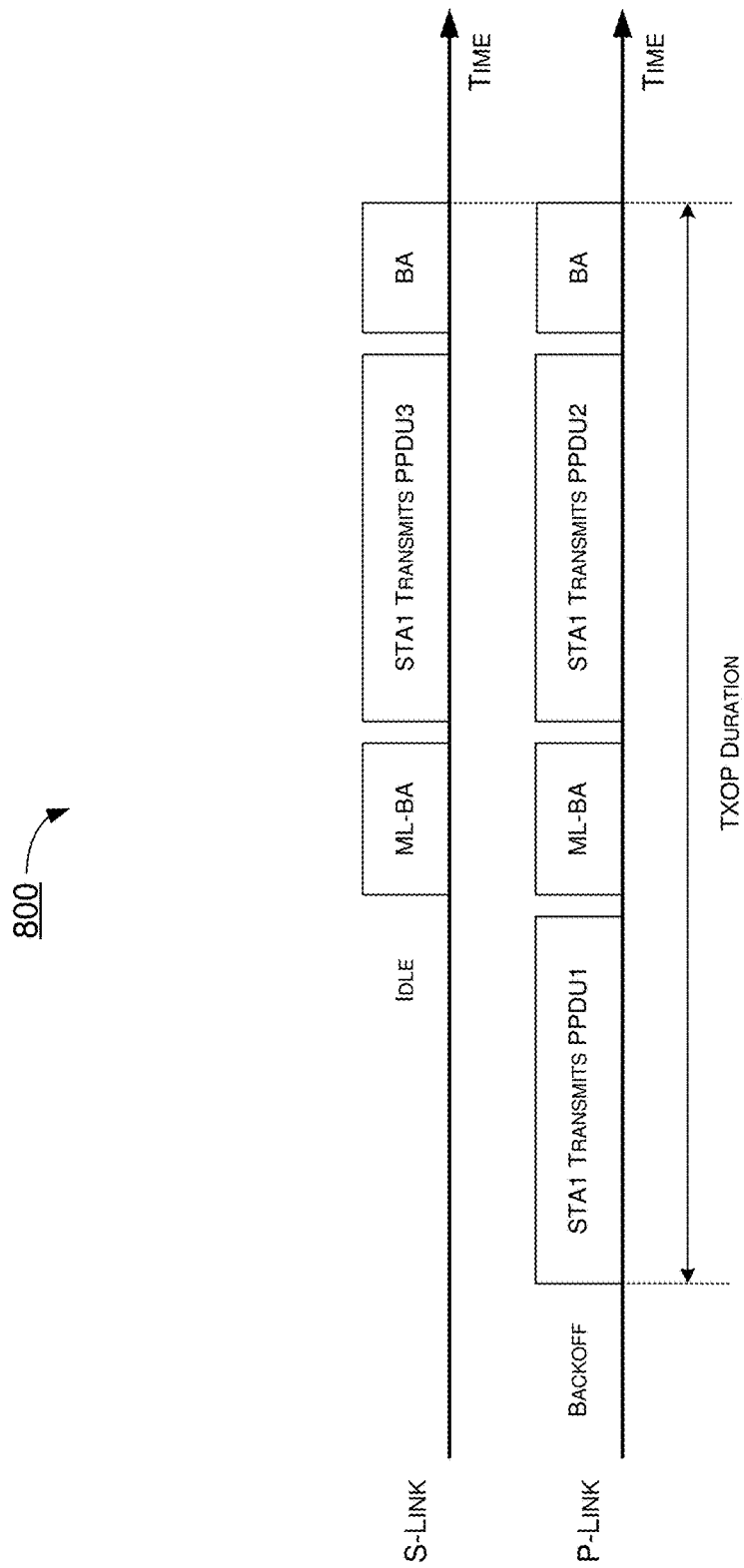
FIG. 8 is a diagram of an example scenario in accordance with the present disclosure.

FIG. 8 illustrates an example scenario 800 in accordance with an implementation of the present disclosure. In scenario 800, AP 120 may be multi-link capable but AP 120 may not perform TX/RX simultaneously on its multiple links. AP 120 may configure a primary link (denoted as "P-Link" in FIG. 8) and transmit a management frame (e.g., beacon, probe response) on the primary link to indicate its multi-link capability. AP 120 may also configure one or more secondary links (denoted as "S-Link" in FIG. 8) to be trigger-based UL enabled and EDCA UL disabled due to no support of simultaneous TX/RX on different links. In scenario 800, STA 110 (denoted as "STA1" in FIG. 8) may only be associated with AP 120 through the primary link. AP 120 may configure the secondary link for STA 110 through the primary link with operating parameters of the secondary link. STA 110 may only contend channel through the primary link. When STA 110 obtains a TXOP on the primary link, STA 110 may indicate secondary link request(s) in a first PPDU (denoted as "PPDU1" in FIG. 8) with link ID(s) bitmap or indication(s). STA 110 may also indicate its buffer status and bandwidth requirements. AP 120 may respond to receipt of the first PPDU on both the primary link and secondary link with trigger information in a control frame (e.g., ML-BA) to solicit synchronous UL transmissions on the P-Link and the S-Link in response to receiving the first PPDU. Accordingly, STA 110 may be triggered to transmit a second PPDU (denoted as "PPDU2" in FIG. 8) and a third PPDU (denoted as "PPDU3" in FIG. 8) on both the primary link and secondary link. The TXOP on the secondary link may be restricted by the TXOP duration of the primary link.

Figure 9:
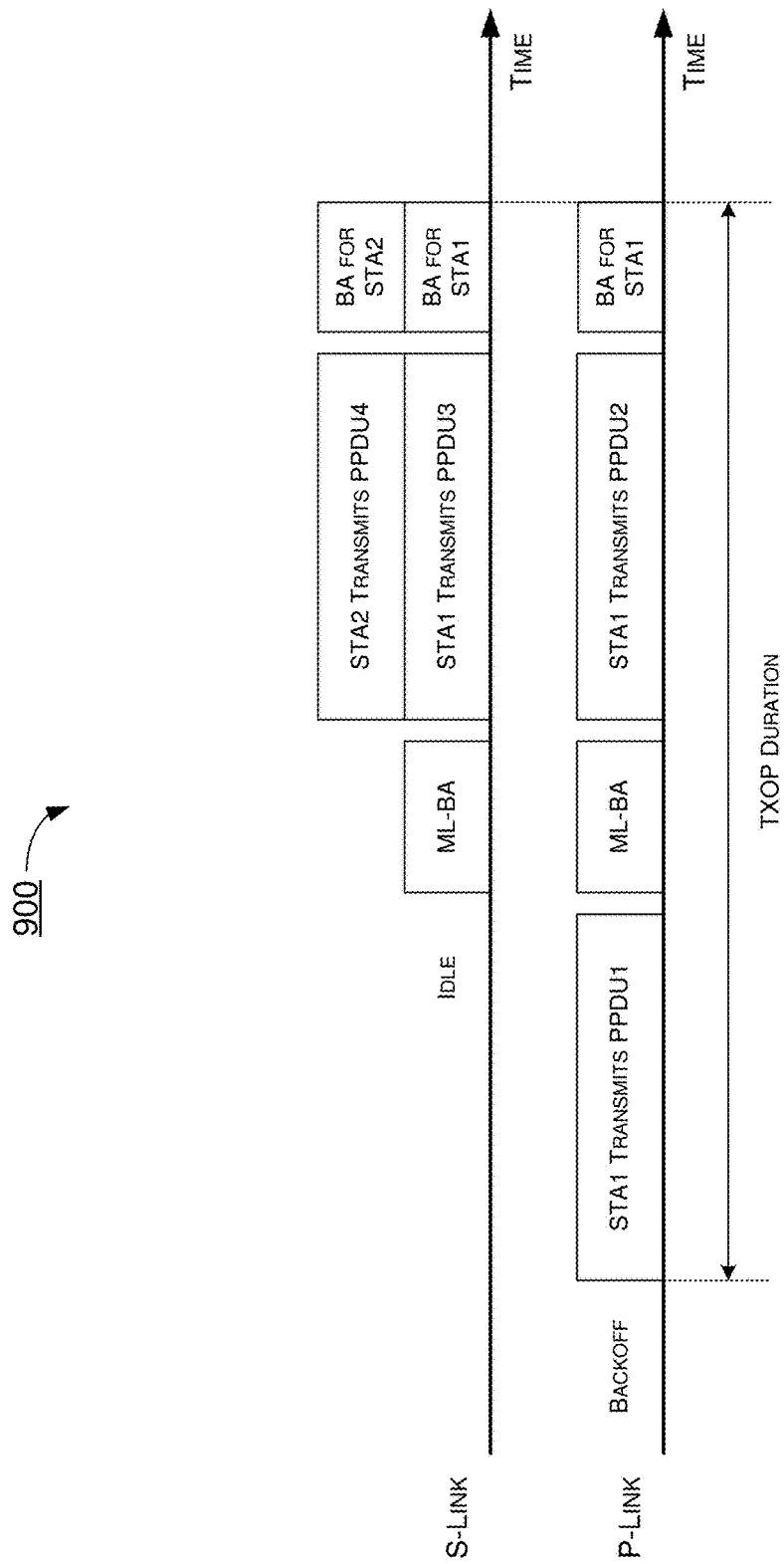
FIG. 9 is a diagram of an example scenario in accordance with the present disclosure.

FIG. 9 illustrates an example scenario 900 in accordance with an implementation of the present disclosure. In scenario 900, AP 120 may be multi-link capable and may configure a primary link (denoted as "P-Link" in FIG. 9) and transmit a management frame (e.g., beacon, probe response) on the primary link to indicate its multi-link capability. In scenario 900, STA 110 (denoted as "STA1" in FIG. 9) and STA 115 (denoted as "STA2" in FIG. 9) may be associated with AP 120 on the primary link and on which each may indicate its multi-link capability. AP 120 may configure one or more secondary links (denoted as "S-Link" in FIG. 9) for each of STA 110 and STA 115 separately through the primary link with operating parameters of the secondary link(s). In scenario 900, AP 120 may not transmit and receive simultaneously and may configure the secondary link(s) to be trigger-based UL enabled and EDCA UL disabled. Moreover, STA 110 and STA 115 may only contend channel through the primary link. When STA 110 obtains a TXOP on the primary link, STA 110 may indicate secondary link request(s) in a first PPDU (denoted as "PPDU1" in FIG. 9). When a secondary link is detected to be idle, AP 120 may respond to the receipt of the first PPDU by transmitting trigger information in a control frame (e.g., ML-BA) on both the primary link and secondary link to solicit synchronous UL transmissions on the P-Link and the S-Link in response to receiving the first PPDU. STA 110 and/or STA 115 may be triggered to transmit a third PPDU (denoted as "PPDU3" in FIG. 9) and a fourth PPDU (denoted as "PPDU4" in FIG. 9) on the secondary link, respectively, in response to the trigger. Besides, STA 110 may also transmit a second PPDU (denoted as "PPDU2" in FIG. 9) on the primary link. In an event that STA 110 does not indicate secondary link request(s) in a first PPDU, STA 115 may still be triggered by AP 120 on the primary link and/or secondary link. The triggered TXOP may be restricted by a TXOP duration on the primary link. Furthermore, AP 120 may respond to the receipt of the second PPDU, third PPDU and fourth PPDU on the specific link with BA on that link or joint BA/multi-TID BA for STA 110 on the primary link and transmit BA for STA 115 on the secondary link.

In scenario 900, idle detection on a link (e.g., secondary link) may be performed in one or more of a number of ways which may be carried out separately or in combination. For instance, AP 120 may check NAV status on the secondary link and, in case NAV is zero, then AP 120 may determine that the secondary link is virtual carrier sense (CS) idle. Alternatively, or additionally, AP 120 may initiate a new EDCA backoff procedure or continue an existing EDCA backoff procedure and perform full CCA (e.g., random backoff with a packet detection (PD) threshold and an energy detection (ED) threshold on a primary 20 MHz channel of the secondary link). Alternatively, or additionally, AP 120 may perform a PIFS check on secondary channels of the secondary link and, in case the channel is idle during the PIFS time, then AP 120 may determine that the secondary channels of the secondary link as being physical CS idle. Alternatively, or additionally, AP 120 may perform a PIFS check on the primary channel of the secondary link and, in case the channel is idle during the PIFS time, then AP 120 may determine that the primary channel of the secondary link as being physical CS idle. Alternatively, or additionally, AP 120 may perform EDCA backoff at a certain starting point (e.g., the starting time of backoff depends on the value of a backoff counter randomly selected by AP 120).

Figure 10:
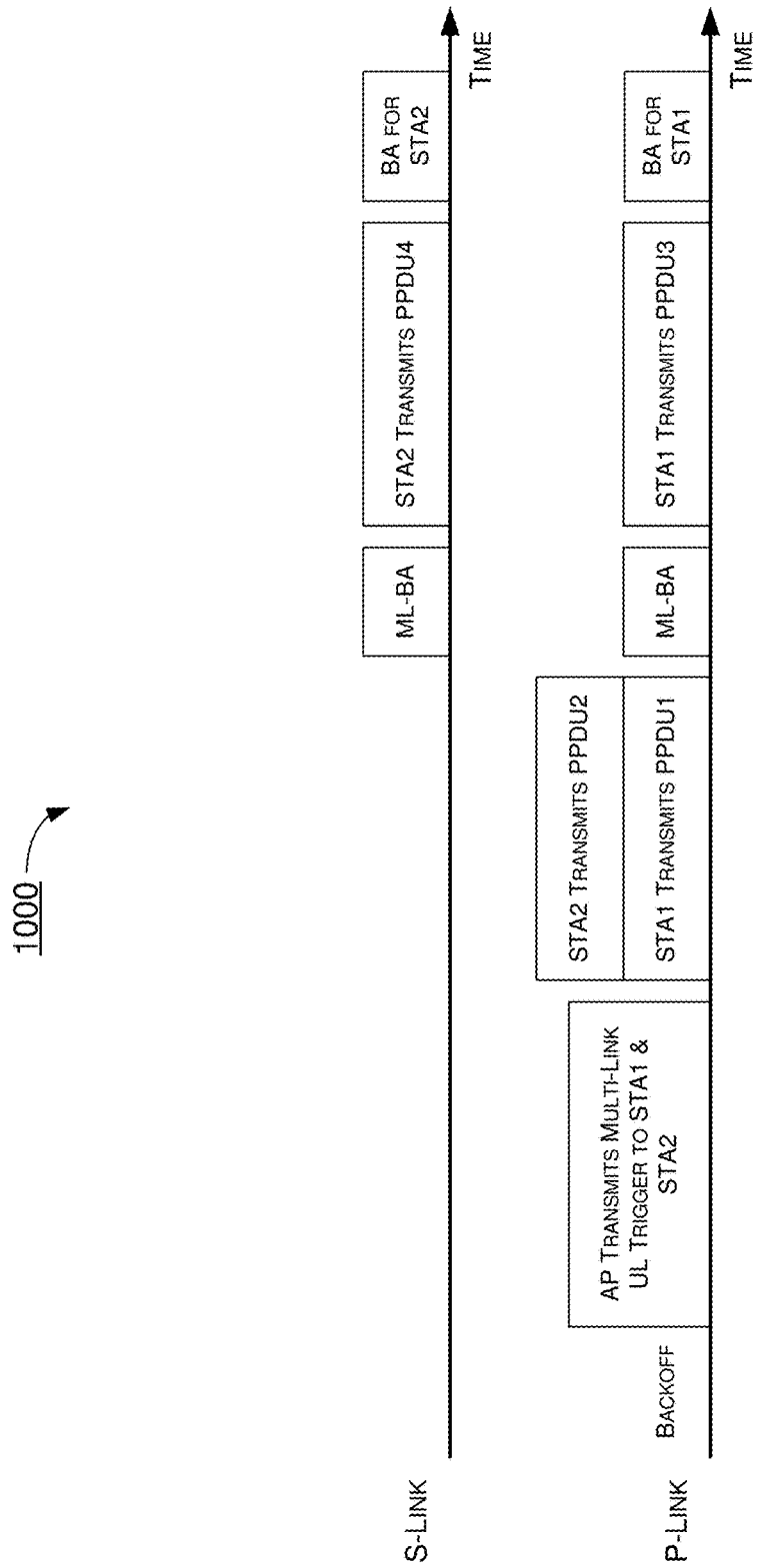
FIG. 10 is a diagram of an example scenario in accordance with the present disclosure.

FIG. 10 illustrates an example scenario 1000 in accordance with an implementation of the present disclosure. In scenario 1000, AP 120 may be multi-link capable and may configure a primary link (denoted as "P-Link" in FIG. 10) and transmit a management frame (e.g., beacon, probe response) on the primary link to indicate its multi-link capability without simultaneous TX/RX. In scenario 1000, STA 110 (denoted as "STA1" in FIG. 10) and STA 115 (denoted as "STA2" in FIG. 10) may be associated with AP 120 on the primary link and on which each may indicate its multi-link capability. AP 120 may configure one or more secondary links (denoted as "S-Link" in FIG. 10) for each of STA 110 and STA 115 separately through the primary link with operating parameters of the secondary link(s). In scenario 900, AP 120 may configure the secondary link to be trigger-based UL enabled and EDCA UL disabled. Moreover, AP 120 may obtain the channel through the primary link and transmit a multi-link UL trigger to STA 110. The multi-link UL trigger may indicate the resource allocation for STA 110 and STA 115 to transmit a first PPUD (denoted as "PPDU1" in FIG. 10) and a second PPDU (denoted as "PPDU2" in FIG. 10), respectively. The multi-link UL trigger may indicate the link ID(s) to trigger STA 110 and/or STA 115 to transmit on the primary link and/or secondary link(s) in subsequent frame exchanges. Accordingly, STA 110 and/or STA 115 may transmit the first PPDU and second PPDU, respectively, with the link ID(s) to indicate the available links. STA 110 and/or STA 115 may also include a buffer status and/or bandwidth requirement(s) in the first PPDU and second PPDU, respectively, with the link ID(s) to indicate the available links. STA 110 and STA 115 may receive a control frame (e.g., ML-BA) on the primary link and secondary link to solicit synchronous UL transmissions on the P-Link and the S-Link in response to receiving the first PPDU. STA 110 may then transmit a third PPDU (denoted as "PPDU3" in FIG. 10) on the primary link and STA 115 may transmit a fourth PPDU (denoted as "PPDU4" in FIG. 10) on the secondary link. The subsequent frame exchanges on both the primary link and secondary link may be synchronized. The triggered TXOP on the secondary link may be restricted by a TXOP duration on the primary link.

It is noteworthy that, for an AP capable of multi-link operation (e.g., AP 120), there may be simultaneous TX/RX constraints on some pair(s) of links. For instance, in a worst-case scenario, DL transmission on one link and UL transmission on another link may overlap most of time. Moreover, when there are legacy STAs (e.g., STAs that do not support multi-link operation), it would be difficult for the AP to coordinate transmission on two links. Thus, to improve spectrum efficiency of the links with IDC interference problem, the present disclosure proposes a number of rules, described below, to avoid simultaneous DL and UL transmissions on both links.

Under a proposed scheme in accordance with the present disclosure, AP 120 may configure one link to be a primary link, or P-Link, and another link to be a secondary link, or S-Link, for multi-link STAs. Under the proposed scheme, legacy STAs or STAs not capable of multi-link operation may be allowed to be associated on the P-Link only. For instance, an AP may set BSS membership to be multi-link capable device only indicated in the specific management frames (e.g., beacon, probe response, etc.) on the secondary link, and/or an AP may transmit the management frames on the secondary link using a PPDU format that legacy STAs cannot decode (e.g., EHT PPDU), or an AP may not transmit the specific management frames (e.g., beacon) on the secondary link. Under the proposed scheme, EDCA channel contention for DL and UL transmissions may be allowed on the P-Link. Moreover, other than certain exceptions described later in the present disclosure, EDCA channel contention on the S-Link may be only allowed for AP 120 to trigger UL transmission. For instance, when AP 120 indicates no DL transmission on the P-Link for a period of time (e.g., in the event of light DL traffic load and heaving UL traffic load), EDCA channel contention may be allowed for non-AP STA (e.g., STA 110 and STA 115) on the S-Link. Under the proposed scheme, DL transmission on the S-Link may be performed together with DL transmission on the P-Link in an event that S-Link is idle. Additionally, DL transmission on the S-Link alone may not be allowed in order to avoid a situation of simultaneous UL transmission on the P-Link and DL on the S-Link.

FIG. 11 illustrates an example scenario 1100 in accordance with the present disclosure. In scenario 1100, a multi-link AP (e.g., AP 120) may start DL transmission on the S-Link together with DL transmission on the P-Link. For instance, as shown in each of part (A) and part (B) of FIG. 11, AP 120 may start DL transmission on the S-Link together with DL transmission on the P-Link when the carrier sense mechanism of AP 120 indicates that the medium is idle on the S-Link, e.g., during the PIFS before the start of DL transmission on the P-Link, or EDCA backoff counter reaches zero.

Figure 12:
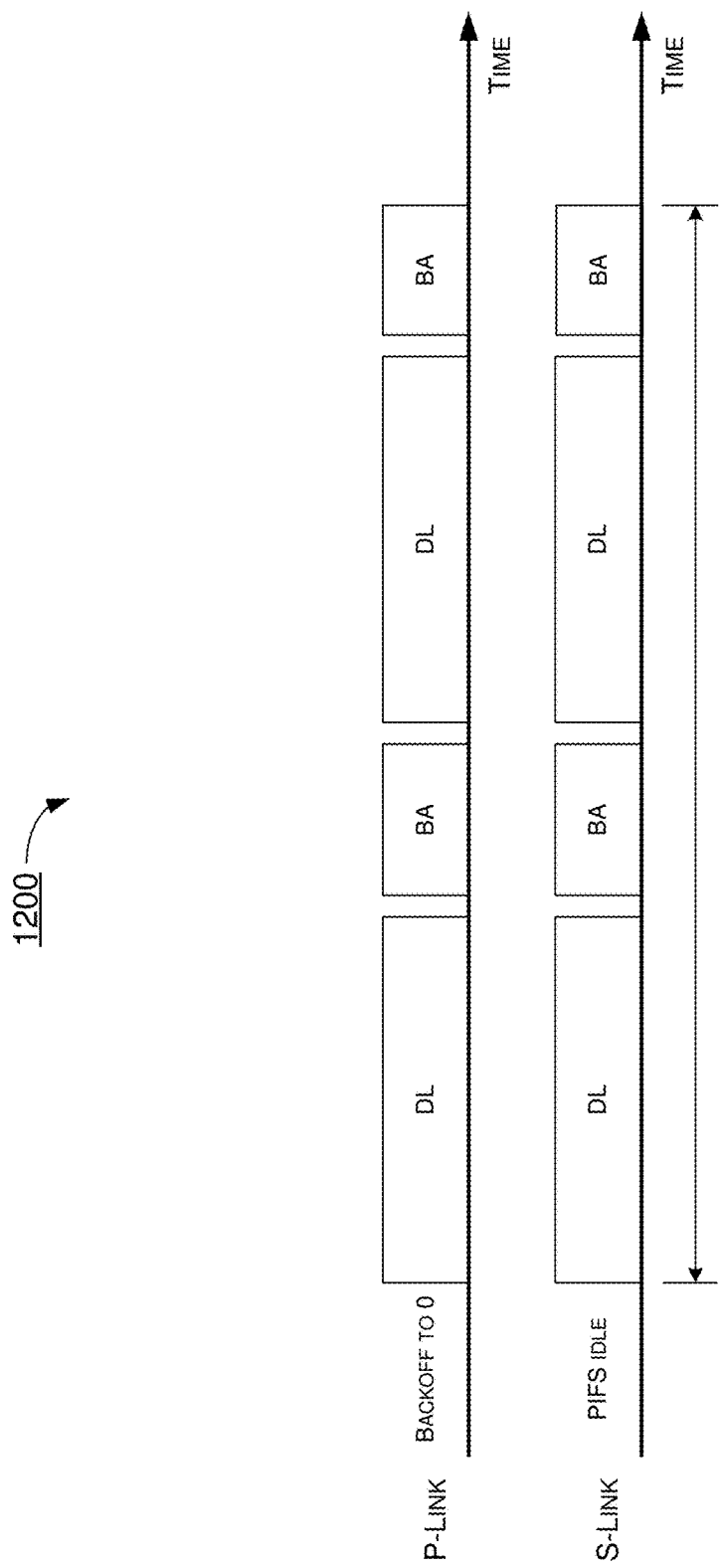
FIG. 12 is a diagram of an example scenario in accordance with the present disclosure.

FIG. 12 illustrates an example scenario 1200 in accordance with the present disclosure. In scenario 1200, the P-Link may be contended with an EDCA backoff procedure by multi-link AP 120 and non-AP STAs (e.g., including STA 110). AP 120 may obtain on the P-Link a TXOP with the EDCA backoff procedure. For example, when its backoff timer counts down to zero, AP 120 may start DL transmission on the P-Link. In an event that AP 120 detects medium idle, e.g., PIFS idle on the S-Link (e.g., NAV=0 and/or PIFS energy detection (ED)-based CCA idle) before the start of DL transmission on the P-Link, then AP 120 may start DL transmission on the S-Link simultaneously together with DL transmission on the P-Link. The transmission and reception within the TXOP on both links may be synchronized by the control of AP 120.

Figure 13:
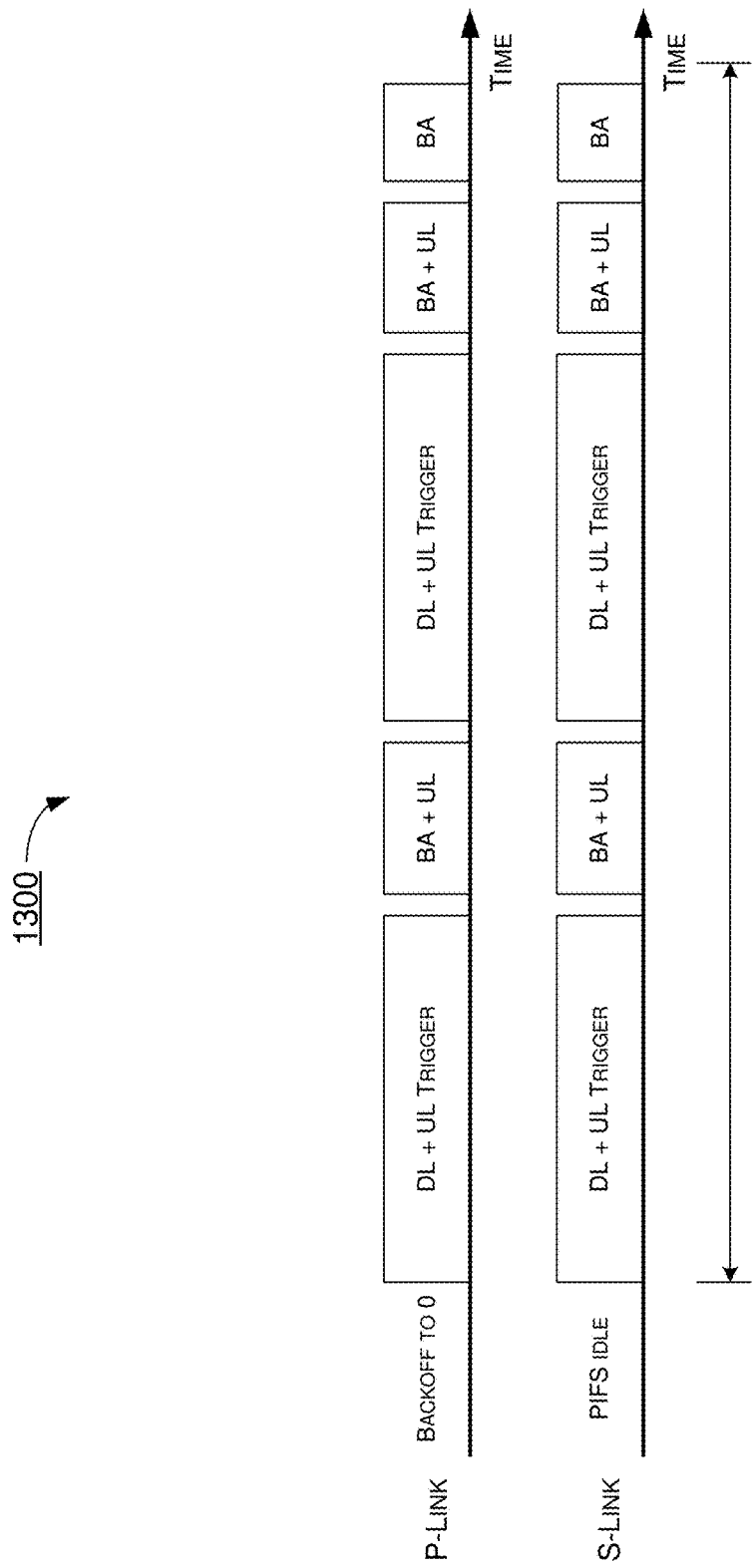
FIG. 13 is a diagram of an example scenario in accordance with the present disclosure.

FIG. 13 illustrates an example scenario 1300 in accordance with the present disclosure. Scenario 1300 is similar to scenario 1200 except that the DL transmissions on both the P-Link and S-Link may include DL data and/or trigger frame(s) to trigger UL transmission.

Under a proposed scheme in accordance with the present disclosure, with respect to rules regarding channel access for the secondary link, multi-link AP 120 may perform a EDCA backoff procedure to content the medium for triggering UL transmission on the S-Link (but not on the P-Link) when there is no simultaneous DL transmission on the P-Link for a period of time in response to one or more of certain conditions being met. Such conditions may include, for example and without limitation, (a) when there is no ongoing downlink (DL) transmission on the P-Link; (b) when an associated non-AP STA (e.g., STA 110 and STA 115) obtains a TXOP on the P-Link; (c) when basic NAV of AP 120 on the P-Link is set (as defined in current IEEE standard, with a timer set by an overlapping basic service set (OBSS) TXOP, meaning there is ongoing DL transmission from other BSS on the P-Link); and (d) when AP 120 indicates no DL transmission (e.g., AP 120 itself would not perform DL transmission) on the P-Link for a period of time. Under the proposed scheme, each of STA 110 and STA 115 may perform an EDCA backoff procedure to contend the medium for UL transmission on the S-Link when AP 120 indicates no DL transmission on the P-Link for a period of time.

Figure 14:
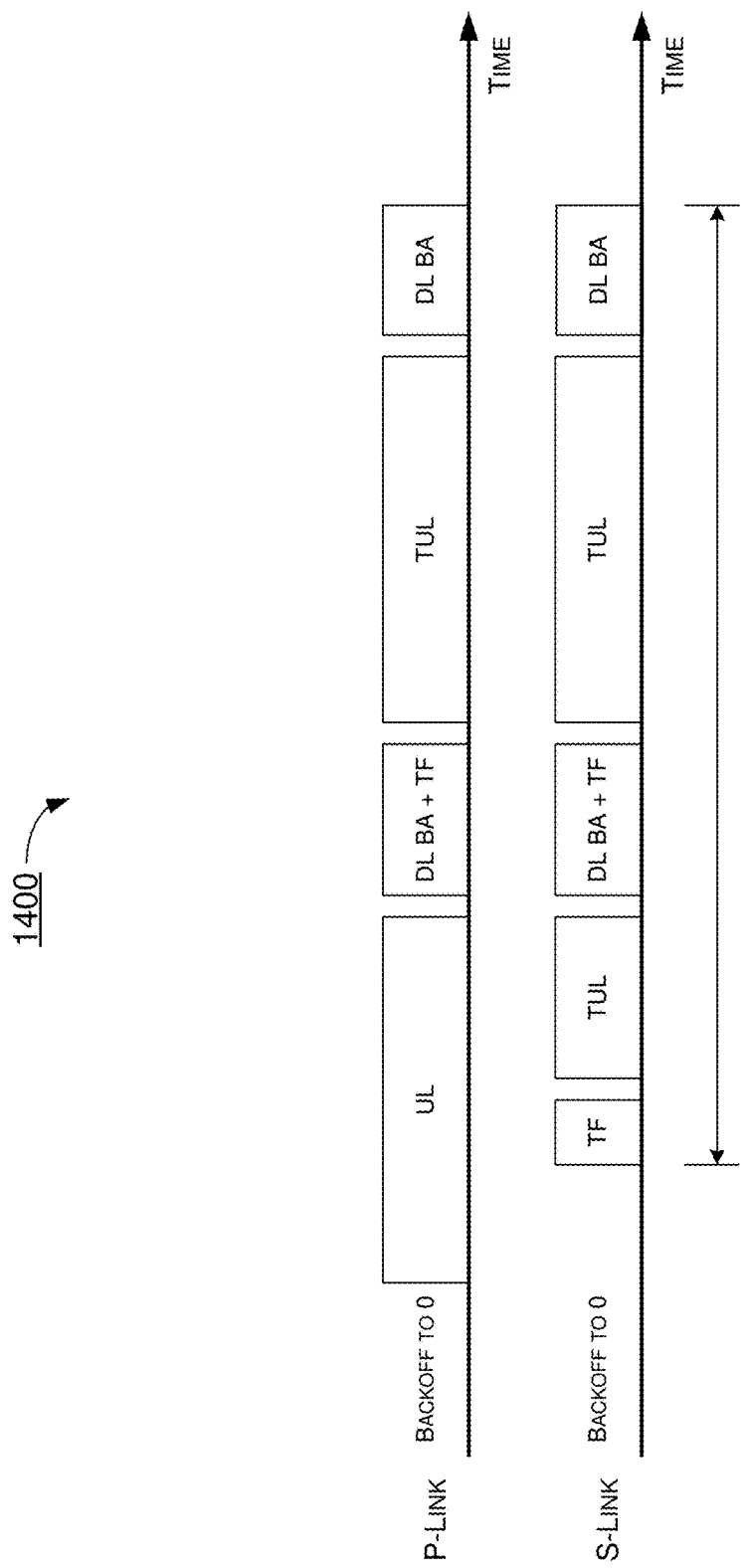
FIG. 14 is a diagram of an example scenario in accordance with the present disclosure.

FIG. 14 illustrates an example scenario 1400 in accordance with the present disclosure. In scenario 1400, the P-Link may be contended with an EDCA backoff procedure by AP 120 and non-AP STAs such as STA 110 and/or STA 115. When AP 120 detects an UL transmission targeted at AP 120 on the P-Link, AP 120 may content on the S-Link for the medium with an EDCA backoff procedure. When its backoff timer counts down to zero, AP 120 may send a trigger frame (denoted as "TF" in FIG. 14) on the S-Link. The UL trigger-based transmission on the S-Link (denoted by "TUL" in FIG. 14) may be limited to end at the same time as the TUL on the P-Link. The transmission and reception within the TXOP on both the P-Link and S-Link may be synchronized by the control of AP 120 in an event that the TXOP holder (e.g., a non-AP STA) on the P-Link supports trigger-based UL transmissions. The duration of the TXOP on the S-Link may be less than or equal to the duration of the TXOP on the P-Link.

Figure 15:
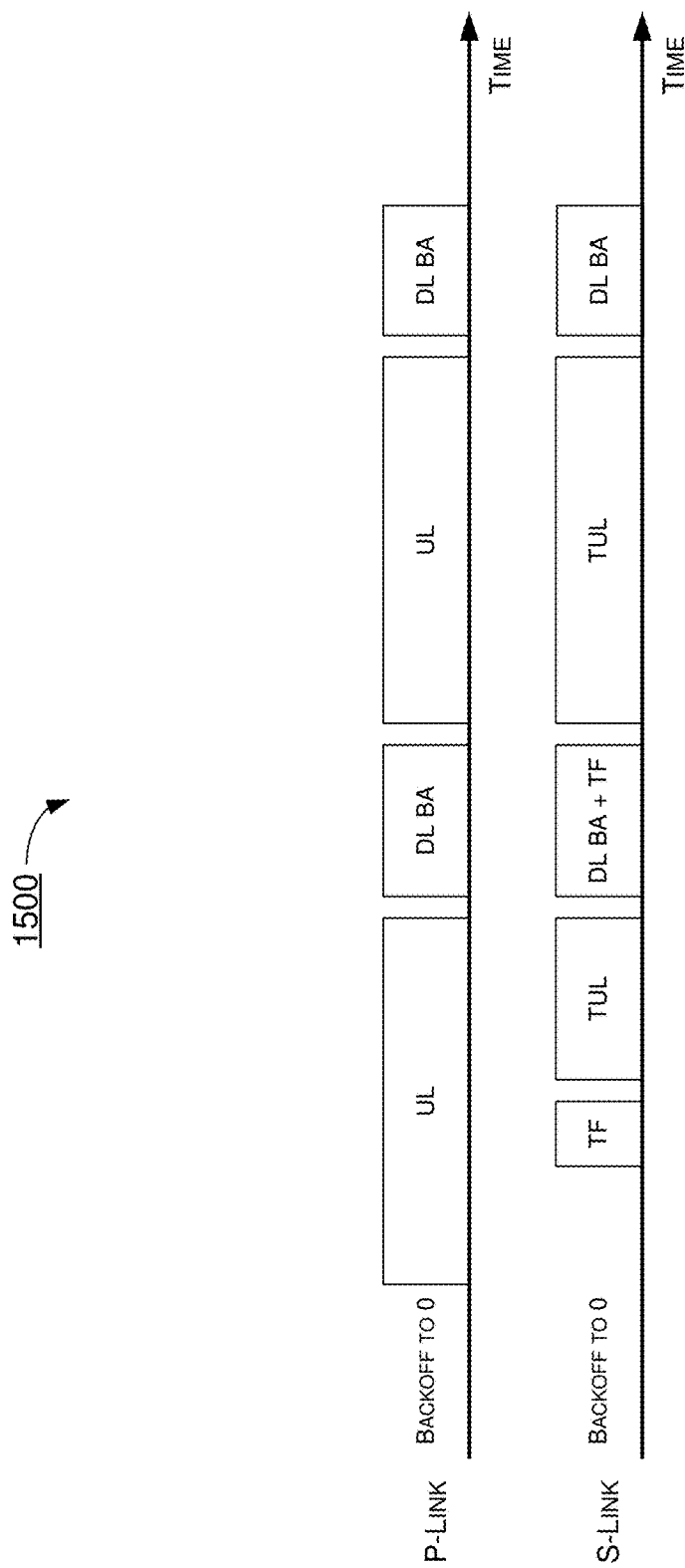
FIG. 15 is a diagram of an example scenario in accordance with the present disclosure.

FIG. 15 illustrates an example scenario 1500 in accordance with the present disclosure. Scenario 1500 is similar to scenario 1400 except that the TXOP holder (e.g., a non-AP STA) on the P-Link is a legacy STA without supporting trigger-based UL transmissions. In scenario 1500, AP 120 may trigger UL transmissions on the S-Link when its backoff timer counts down to zero on the S-Link. Moreover, the duration of TXOP on the S-Link may be less than or equal to the duration of the TXOP on the P-Link.

Figure 16:
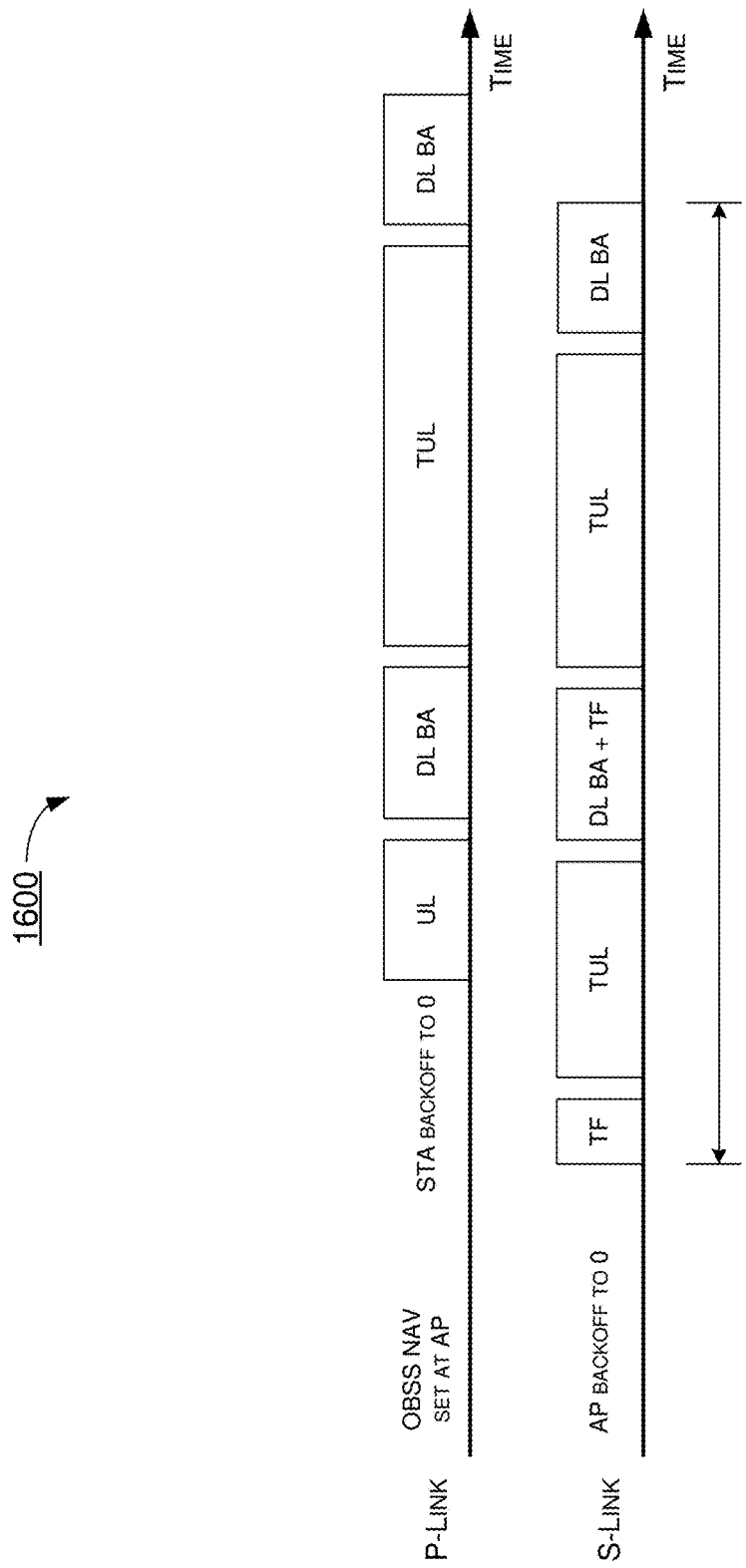
FIG. 16 is a diagram of an example scenario in accordance with the present disclosure.

FIG. 16 illustrates an example scenario 1600 in accordance with the present disclosure. In scenario 1600, AP 120 may detect that a channel is busy on the P-Link due to OBSS (e.g., basic NAV>0). A timer at AP 120 for EDCA backoff may count down to zero on the S-Link and then AP 120 may transmit UL trigger frame(s) to trigger UL transmission from a STA (e.g., STA 110 or STA 115). A timer at a non-AP STA (e.g., STA 110 or STA 115) for EDCA backoff may count down on the P-Link and then the non-AP STA may transmit UL transmission targeted at AP 120. The TXOP for UL trigger-based transmissions (each denoted as "TUL" in FIG. 16) on the S-Link may be limited to OBSS NAV on the P-Link. The TXOPs on both the P-Link and S-Link may be for UL transmissions.

Figure 17:
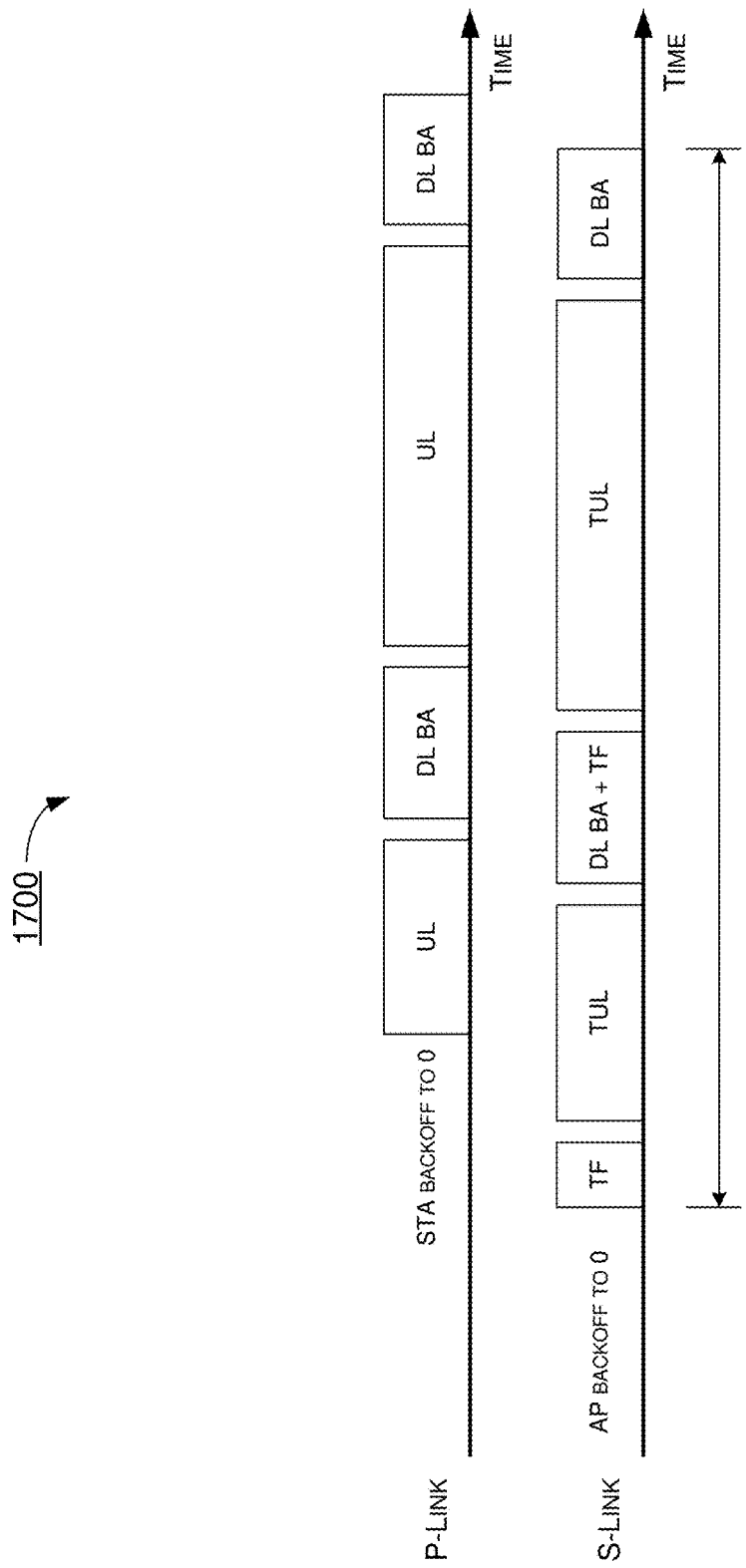
FIG. 17 is a diagram of an example scenario in accordance with the present disclosure.

FIG. 17 illustrates an example scenario 1700 in accordance with the present disclosure. In scenario 1700, the P-Link may be contended with an EDCA backoff procedure by AP 120 and non-AP STAs (e.g., STA 110 and STA 115). When AP 120 indicates on the P-Link no DL transmission for a period of time (e.g., target wake time (TWT), beacon interval, delivery traffic indication map (DTIM) interval, and so forth), AP 120 may contend on the S-Link the medium to trigger UL transmissions using EDCA on the S-Link within the indicated period of time. When AP 120 on the S-Link counts down its backoff timer to zero, AP 120 may initiate a TXOP and transmit an UL trigger on the S-Link. Another TXOP on the P-Link may be obtained by a non-AP STA for UL transmissions. Both TXOPs may be independent from each other.

Figure 18:
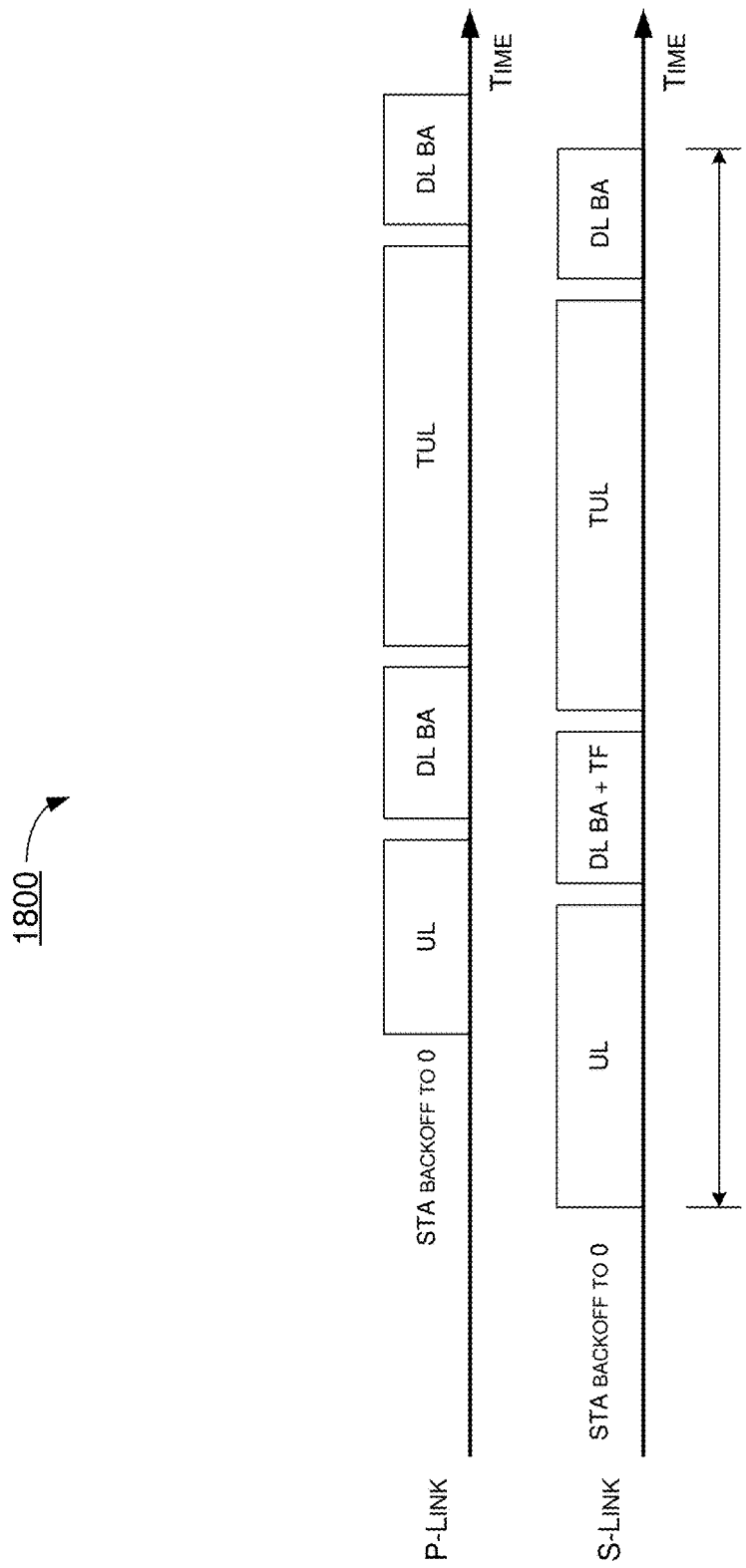
FIG. 18 is a diagram of an example scenario in accordance with the present disclosure.

FIG. 18 illustrates an example scenario 1800 in accordance with the present disclosure. In scenario 1800, the P-Link may be contended with an EDCA backoff procedure by AP 120 and non-AP STAs (e.g., STA 110 and STA 115). When AP 120 indicates on the P-Link no DL transmission for a period of time (e.g., TWT, beacon interval, DTIM interval, and so forth), the non-AP STAs may contend the medium for UL transmission using EDCA on the S-Link within the indicated period of time. When a non-AP STA (e.g., STA 110 or STA 115) on the S-Link counts down its backoff timer to zero, the non-AP STA may initiate a TXOP and start an UL transmission on the S-Link. Another TXOP on the P-Link may be obtained by the same or a different non-AP STA for UL transmissions. Both TXOPs may be independent from each other.

Under a proposed scheme with respect to solicited UL TXOP in accordance with the present disclosure, a multi-link device (e.g., AP 120) may set up a pair of links and the multi-link device may require that non-AP STAs on each link of the pair of links shall solicit (e.g., request for permission for) an UL TXOP by sending a request frame using EDCA. The multi-link AP 120 receiving the request frame on one of the links may send a response frame in responding to the request frame on that link. For instance, AP 120 may, upon receiving a request frame, transmit a response frame when there is no ongoing TXOP with DL data transmission on the other link of the pair of links. Under the proposed scheme, AP 120 may trigger UL transmissions on the other link of the pair of links. Moreover, AP 120 may not contend for DL transmission on the other link of the pair of links within the duration requested by the request frame. Additionally, AP 120 may, on each link of the pair of links, independently contend the medium using EDCA. Some examples of solicited contention-based channel access for UL transmissions are shown in FIG. 19~FIG. 21.

Figure 19:
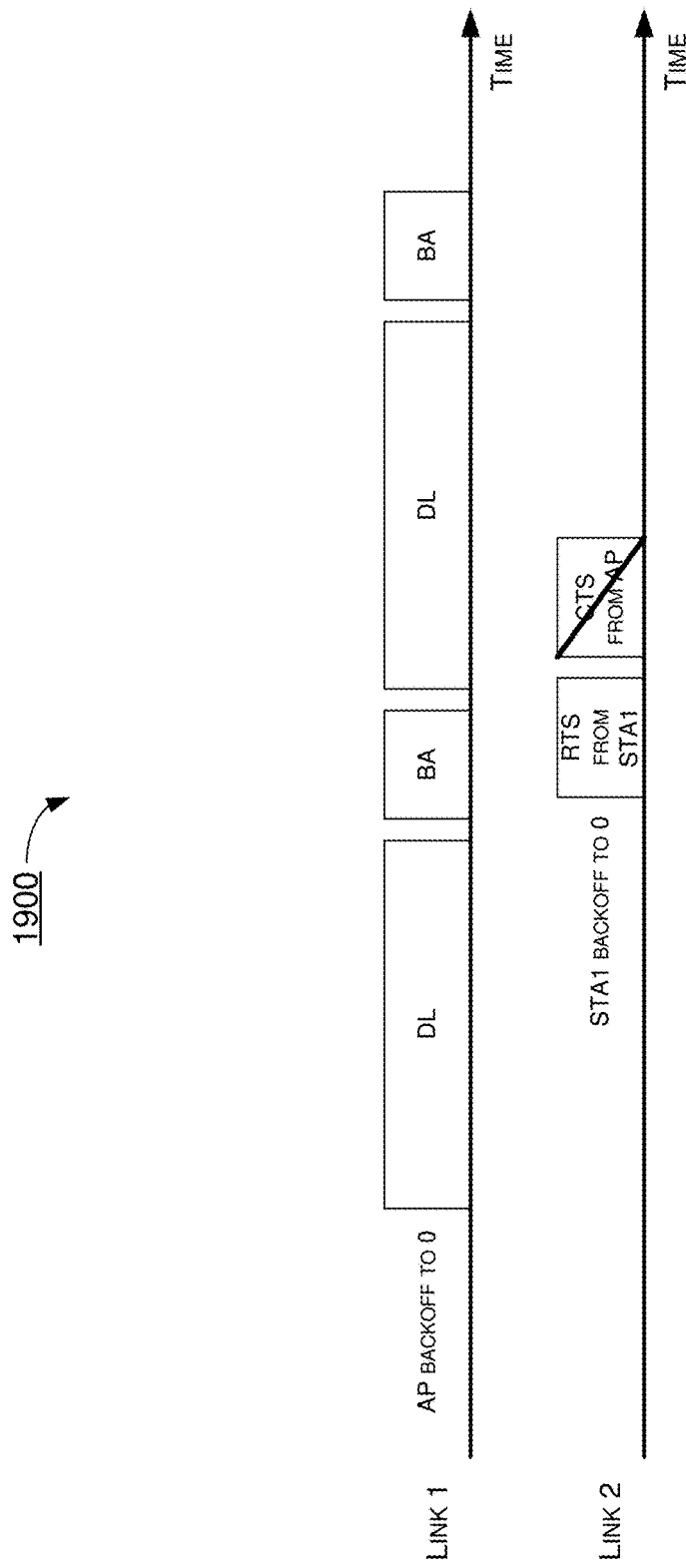
FIG. 19 is a diagram of an example scenario in accordance with the present disclosure.

FIG. 19 illustrates an example scenario 1900 in accordance with the present disclosure. In scenario 1900, a multi-link device (e.g., AP 120) may set up two links in the 6 GHz band (e.g., Link 1 and Link 2). AP 120 may not support simultaneous transmission on one link and reception on the other link. AP 120 may, on each link, indicate that non-AP STAs (e.g., STA 110 and STA 115) shall send a request frame using EDCA to solicit a TXOP for UL transmissions. For instance, APL 120 may set TXOP-based request to send (RTS) threshold to be 0 or a small value so that non-AP STAs may always transmit a RTS frame to obtain a TXOP for UL data transmissions. A non-AP STA (e.g., STA 110 or STA 115) on Link 2 may contend for the medium using EDCA to send a request frame (e.g., RTS) and wait for a response frame (e.g., clear to send (CTS)). However, in this example, AP 120 may not respond to the request frame on Link 2 since there is an ongoing DL TXOP on Link 1.

Figure 20:
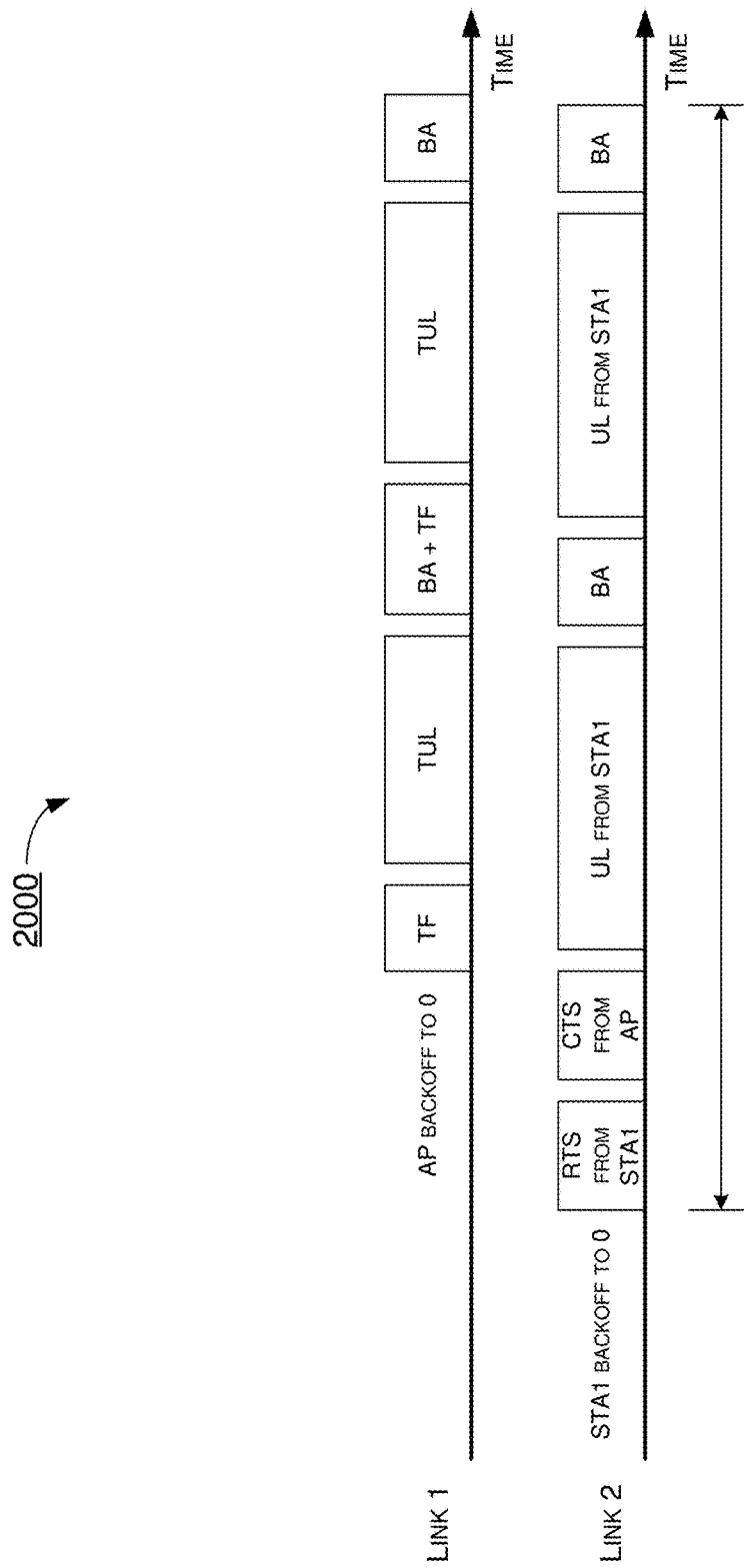
FIG. 20 is a diagram of an example scenario in accordance with the present disclosure.

FIG. 20 illustrates an example scenario 2000 in accordance with the present disclosure. In scenario 2000, a multi-link device (e.g., AP 120) may set up two links in the 6 GHz band (e.g., Link 1 and Link 2). AP 120 may not support simultaneous transmission on one link and reception on the other link. AP 120 may, on each link, indicate that non-AP STAs (e.g., STA 110 and STA 115) shall send a request frame using EDCA to solicit a TXOP for UL transmissions. For instance, APL 120 may set TXOP-based RTS threshold to be 0 or a small value so that non-AP STAs may always transmit a RTS frame to obtain a TXOP for UL data transmissions. A non-AP STA (e.g., STA 110 or STA 115) on Link 2 may contend for the medium using EDCA to send a request frame (e.g., RTS) and wait for a response frame (e.g., CTS). The non-AP STA on Link 2 may receive a CTS frame and obtain a TXOP for transmitting UL data. AP 120 may, on Link 1, trigger UL transmission using EDCA.

Figure 21:
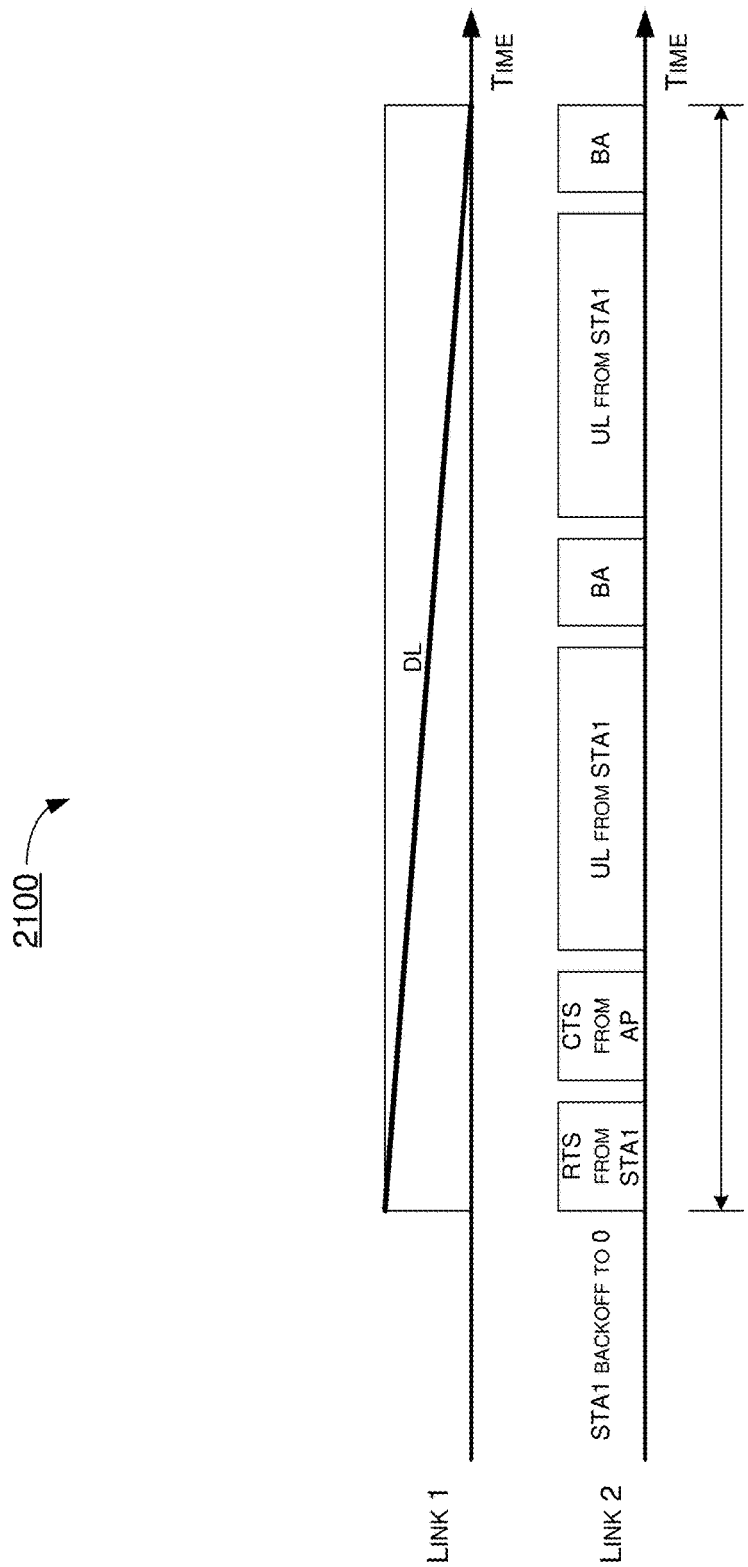
FIG. 21 is a diagram of an example scenario in accordance with the present disclosure.

FIG. 21 illustrates an example scenario 2100 in accordance with the present disclosure. In scenario 2100, a multi-link device (e.g., AP 120) may set up two links in the 6 GHz band (e.g., Link 1 and Link 2). AP 120 may not support simultaneous transmission on one link and reception on the other link. AP 120 may, on each link, indicate that non-AP STAs (e.g., STA 110 and STA 115) shall send a request frame using EDCA to solicit a TXOP for UL transmissions. For instance, APL 120 may set TXOP-based RTS threshold to be 0 or a small value so that non-AP STAs may always transmit a RTS frame to obtain a TXOP for UL data transmissions. A non-AP STA (e.g., STA 110 or STA 115) on Link 2 may contend for the medium using EDCA to send a request frame (e.g., RTS) and wait for a response frame (e.g., CTS). AP 120 may respond to the request frame on Link 2 since there is no ongoing DL TXOP on Link 1. In the example shown in FIG. 21, AP 120 may not start DL transmissions on Link 1 within the duration of the TXOP obtained by STA1 on Link 2. For instance, AP 120 may suspend any ongoing backoff procedure on Link 1 for DL transmission till the end of duration of the TXOP on Link 2. Alternatively, there may be internal collision until the end of duration of the TXOP on Link 2.

Illustrative Implementations

Figure 22:
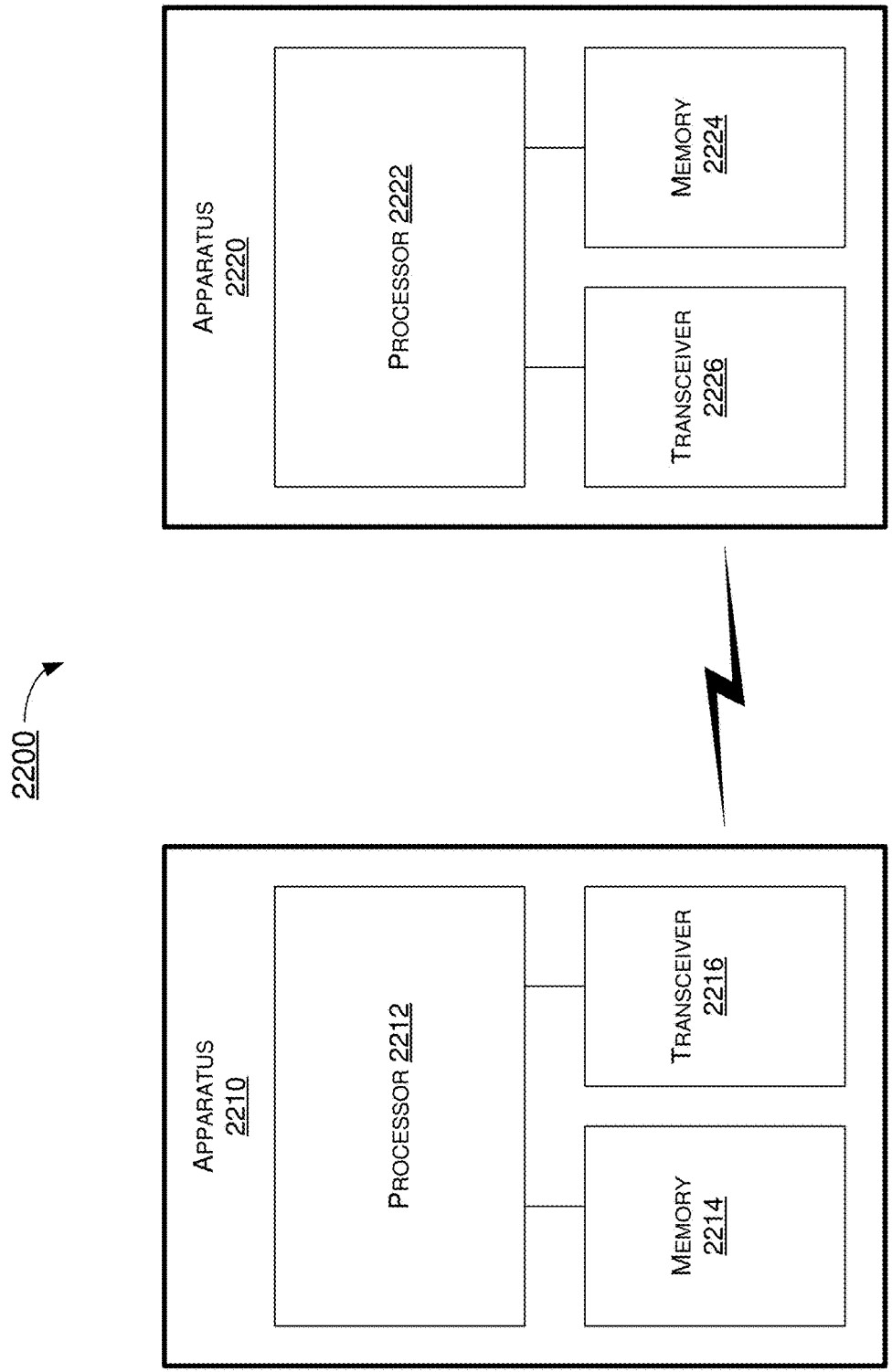
FIG. 22 is a block diagram of an example communication system in accordance with an implementation of the present disclosure.

FIG. 22 illustrates an example system 2200 having at least an example apparatus 2210 and an example apparatus 2220 in accordance with an implementation of the present disclosure. Each of apparatus 2210 and apparatus 2220 may perform various functions to implement schemes, techniques, processes and methods described herein pertaining to EHT multi-link channel access and operation in wireless communications, including the various schemes described above with respect to various proposed designs, concepts, schemes, systems and methods described above as well as processes described below. For instance, apparatus 2210 may be implemented in STA 110 or STA 115 and apparatus 2220 may be implemented in AP 120, or vice versa.

Each of apparatus 2210 and apparatus 2220 may be a part of an electronic apparatus, which may be a STA or an AP, such as a portable or mobile apparatus, a wearable apparatus, a wireless communication apparatus or a computing apparatus. When implemented in a STA, each of apparatus 2210 and apparatus 2220 may be implemented in a smartphone, a smart watch, a personal digital assistant, a digital camera, or a computing equipment such as a tablet computer, a laptop computer or a notebook computer. Each of apparatus 2210 and apparatus 2220 may also be a part of a machine type apparatus, which may be an IoT apparatus such as an immobile or a stationary apparatus, a home apparatus, a wire communication apparatus or a computing apparatus. For instance, each of apparatus 2210 and apparatus 2220 may be implemented in a smart thermostat, a smart fridge, a smart door lock, a wireless speaker or a home control center. When implemented in or as a network apparatus, apparatus 2210 and/or apparatus 2220 may be implemented in a network node, such as an AP in a WLAN.

In some implementations, each of apparatus 2210 and apparatus 2220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2210 and apparatus 2220 may be implemented in or as a STA or an AP. Each of apparatus 2210 and apparatus 2220 may include at least some of those components shown in FIG. 22 such as a processor 2212 and a processor 2222, respectively, for example. Each of apparatus 2210 and apparatus 2220 may further include one or more other components not pertinent to the proposed scheme of the present disclosure (e.g., internal power supply, display device and/or user interface device), and, thus, such component(s) of apparatus 2210 and apparatus 2220 are neither shown in FIG. 22 nor described below in the interest of simplicity and brevity.

In one aspect, each of processor 2212 and processor 2222 may be implemented in the form of one or more single-core processors, one or more multi-core processors, one or more RISC processors or one or more CISC processors. That is, even though a singular term "a processor" is used herein to refer to processor 2212 and processor 2222, each of processor 2212 and processor 2222 may include multiple processors in some implementations and a single processor in other implementations in accordance with the present disclosure. In another aspect, each of processor 2212 and processor 2222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2212 and processor 2222 is a special-purpose machine specifically designed, arranged and configured to perform specific tasks including those pertaining to EHT multi-link channel access and operation in wireless communications in accordance with various implementations of the present disclosure.

In some implementations, apparatus 2210 may also include a transceiver 2216 coupled to processor 2212. Transceiver 2216 may include a transmitter capable of wirelessly transmitting and a receiver capable of wirelessly receiving data. In some implementations, apparatus 2220 may also include a transceiver 2226 coupled to processor 2222. Transceiver 2226 may include a transmitter capable of wirelessly transmitting and a receiver capable of wirelessly receiving data.

In some implementations, apparatus 2210 may further include a memory 2214 coupled to processor 2212 and capable of being accessed by processor 2212 and storing data therein. In some implementations, apparatus 2220 may further include a memory 2224 coupled to processor 2222 and capable of being accessed by processor 2222 and storing data therein. Each of memory 2214 and memory 2224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2214 and memory 2224 may include a type of read-only memory (ROM) such as mask ROM, programmable ROM (PROM), erasable programmable ROM (EPROM) and/or electrically erasable programmable ROM (EEPROM). Alternatively, or additionally, each of memory 2214 and memory 2224 may include a type of non-volatile random-access memory (NVRAM) such as flash memory, solid-state memory, ferroelectric RAM (FeRAM), magnetoresistive RAM (MRAM) and/or phase-change memory.

Each of apparatus 2210 and apparatus 2220 may be a communication entity capable of communicating with each other using various proposed schemes in accordance with the present disclosure. For illustrative purposes and without limitation, a description of capabilities of apparatus 2210, as STA 220, and apparatus 2220, as AP 120, is provided below. It is noteworthy that, although the example implementations described below are provided in the context of WLAN, the same may be implemented in other types of networks.

Under a proposed scheme pertaining to EHT multi-link channel access and operation in accordance with the present disclosure, with apparatus 2210 implemented in or as STA 110 and apparatus 2220 implemented in or as AP 120 associated with a BSS (e.g., BSS 130) of a wireless network such as a WLAN in network environment 100 in accordance with one or more of IEEE 802.11 standards, processor 2222 of apparatus 2220 may establish, via transceiver 2226, a plurality of links comprising a primary link and at least a secondary link. Additionally, processor 2222 may transmit, via transceiver 2226, a management frame (e.g., beacon) on the primary link to indicate a multi-link capability of apparatus 2220. Moreover, processor 2222 may configure, via transceiver 2226, the secondary link for one or more non-AP STAs (e.g., apparatus 2210 as STA 110), which are capable of operating on the primary link and the secondary link, with multi-link capability and operating parameters through an association procedure on the primary link. In some implementations, processor 2222 may establish the primary link and the secondary link in an event that apparatus 2220 is unable to support simultaneous transmission and reception on the primary link and the secondary link. In some implementations, processor 2222 may allow another one or more non-AP STAs (e.g., legacy STAs), which are not capable of multi-link operation, to be associated on the primary link but not on the secondary link.

In some implementations, processor 2222 may configure the secondary link to be enabled for trigger-based uplink channel access and disabled for contention-based uplink channel access. In such cases, processor 2222 may configure the secondary link in an event that apparatus 2220 is unable to support simultaneous transmission and reception on the primary link and the secondary link.

In some implementations, a TXOP initiated on the primary link, as a triggering TXOP, may trigger another TXOP on the secondary link, as a triggered TXOP. In some implementations, the triggering TXOP and triggered TXOP may be synchronized. For instance, an end point of the triggered TXOP on the secondary link may be the same with or earlier than an end point of the triggering TXOP on the primary link. In some implementations, starting and end points of PPDUs on the primary link and the secondary link may be aligned with a duration of the triggered TXOP.

In some implementations, processor 2222 may perform additional operations. For instance, processor 2222 may trigger, via transceiver 2226, the associated one or more STAS to perform an UL transmission on the secondary link by at least one of the following: (a) directly contending a medium on the secondary link to transmit an UL trigger frame; (b) initiating by one of the one or more STAs through a trigger request indication (e.g., reverse-direction exchange indication) in an ongoing PPDU on the primary link; and (c) multi-link acknowledgement with trigger information on the primary link or on both the primary link and the secondary link.

In some implementations, processor 2222 may perform additional operations. For instance, processor 2222 may receive, via transceiver 2226, a first PPDU from apparatus 2210 as a first STA (e.g., STA 110) of one or more STAs on the primary link, with the first PPDU containing a request to trigger UL transmissions on the secondary link. Moreover, processor 2222 may transmit, via transceiver 2226, a control frame (e.g., ML-BA) with trigger information on the primary link and the secondary link soliciting synchronous UL transmissions on the primary link and the secondary link responsive to receiving the first PPDU. Additionally, processor 2222 may receive, via transceiver 2226, additional PPDUs from apparatus 2210 or from apparatus 2210 and at least a second STA of the associated one or more STAs on the primary link and the secondary link responsive to transmitting the control frame. Furthermore, processor 2222 may transmit, via transceiver 2226, synchronous BAs, each for a respective one of the additional PPDUs, on the primary link and the secondary link responsive to receiving the additional PPDUs.

In some implementations, processor 2222 may perform additional operations. For instance, processor 2222 may transmit, via transceiver 2226, a multi-link UL trigger on the primary link, with the multi-link UL trigger containing a link ID bitmap indicating that at least one link of the plurality of links is triggered. Additionally, processor 2222 may receive, via transceiver 2226, one or more PPDUs from the associated one or more STAs on the at least one link that is triggered.

In some implementations, processor 2222 may perform additional operations. For instance, processor 2222 may configure, via transceiver 2226, the primary link and secondary link so that: (a) contention by at least one of the one or more STAs and one or more other APs on the primary link by EDCA channel contention is allowed for DL and UL transmissions, and (b) contention by at least one of the one or more STAs and the one or more other APs on the secondary link by EDCA channel contention is allowed for apparatus 2220 to trigger UL transmissions except as indicated by apparatus 2220 as the AP. For instance, apparatus 2220 may indicate, as an exception, that no DL transmission is allowed on the primary link for a period of time. In such cases, EDCA channel contention on the secondary link by the one or more STAs may be allowed. Additionally, processor 2222 may perform, via transceiver 2226, an EDCA backoff procedure to contend for a medium on the secondary link to trigger UL transmissions in an event that there is no simultaneous DL transmission on the primary link for the period of time. Moreover, processor 2222 may trigger, via transceiver 2226, UL transmissions on the secondary link.

In some implementations, processor 2222 may also configure the primary link and secondary link so that a DL transmission on the secondary link by EDCA channel contention is allowed only together with a DL transmission on the primary link.

In some implementations, processor 2222 may perform additional operations. For instance, processor 2222 may indicate, via transceiver 2226, on each of a first link and a second link (e.g., the primary link and one of the secondary links) of the plurality of links to the one or more STAs to solicit an UL TXOP using EDCA. Additionally, processor 2222 may receive, via transceiver 2226, a request frame on the second link from a first STA (e.g., apparatus 2210 as STA 110) of the one or more STAs responsive to the indicating. Moreover, processor 2222 may transmit, via transceiver 2226, a response frame to the one of the first STA to result in the first STA obtaining the UL TXOP on the second link in an event that there is no ongoing DL TXOP on the first link. Furthermore, processor 2222 may perform either of the following: (1) triggering UL transmissions on the first link using EDCA, and (2) refraining from DL transmission on the first link within a duration of the UL TXOP on the second link obtained by the first STA.

Under another proposed scheme pertaining to EHT multi-link channel access and operation in accordance with the present disclosure, with apparatus 2210 implemented in or as STA 110 and apparatus 2220 implemented in or as AP 120 associated with a BSS (e.g., BSS 130) of a wireless network such as a WLAN in network environment 100 in accordance with one or more of IEEE 802.11 standards, processor 2212 of apparatus 2210 may receive, via transceiver 2216, a management frame (e.g., beacon) from apparatus 2220 as an AP (e.g., AP 120) on a primary link of a plurality of links comprising the primary link and at least a secondary link, the management frame indicating a multi-link capability of apparatus 2220 (and apparatus 2210 is capable of operating on the primary link and the secondary link). Moreover, processor 2212 may perform, via transceiver 2216, an association procedure on the primary link. Additionally, processor 2212 may receive, via transceiver 2216, a configuration on the primary link from apparatus 2220 configuring the secondary link. Furthermore, processor 2212 may perform, via transceiver 2216, one or more UL transmissions by: (i) contending a medium on the primary link, and (ii) monitoring either or both of the primary link and the secondary link for a trigger.

In some implementations, processor 2212 may perform additional operations. For instance, in an event that apparatus 2210 is not capable of multi-link operation, processor 2212 may perform, via transceiver 2216, association on the primary link but not on the secondary link. Moreover, processor 2212 may perform, via transceiver 2216, one or more UL transmissions by either or both of: (i) contending for a medium on the primary link and, and (ii) monitoring the primary link for a trigger.

In some implementations, an ongoing TXOP of an intra-BSS frame exchange on the primary link, as a triggering TXOP, may trigger another TXOP on the secondary link, as a triggered TXOP. In some implementations, the triggering TXOP and triggered TXOP may be synchronized. In some implementations, an end point of the triggered TXOP on the secondary link may be the same with or earlier than an end point of the triggering TXOP on the primary link.

In some implementations, in an event that the ongoing TXOP is initiated by apparatus 2210, apparatus 2210 may indicate a grant to apparatus 2220 for apparatus 2220 to trigger apparatus 2210 or associated another STA to perform an UL transmission on either or both of the primary link and the secondary link. Moreover, apparatus 2220 may respond to apparatus 2210 with an acknowledgement and trigger information to trigger one or more STAs associated with apparatus 2220 to perform UL transmissions on either or both of the primary link and the secondary link.

In some implementations, the trigger information may be transmitted on either or both of the primary link and the secondary link. In some implementations, the trigger information may indicate at least one of the following: (a) a link ID bitmap indicating at least one of the one or more STAs to monitor the trigger on at least one link of the plurality of links that is triggered; (b) a target time for the at least one of the one or more STAs to receive the trigger; and (c) resource scheduling information or a transmission parameter, or both.

In some implementations, in an event that the ongoing TXOP is initiated by apparatus 2220, apparatus 2220 may trigger one or more associated STAs to perform UL transmissions on either or both of the primary link and the secondary link. Moreover, apparatus 2220 may trigger by transmitting trigger information on the primary link.

In some implementations, in response to receiving the trigger information from apparatus 2220, apparatus 2210 may respond with a trigger-based PPDU and a request for another trigger on the primary link and the secondary link.

In some implementations, processor 2212 may perform additional operations. For instance, processor 2212 may transmit, via transceiver 2216, a request to apparatus 2220 on the primary link requesting to be triggered for UL transmissions on the secondary link. Furthermore, processor 2212 may receive, via transceiver 2216, a trigger frame addressed to apparatus 2210 on the secondary link responsive to the transmitting of the request. Moreover, processor 2212 may perform, via transceiver 2216, a CCA on the secondary link responsive to receiving the trigger frame. Furthermore, processor 2212 may refrain from UL transmissions on the secondary link either until a frame is detected by which apparatus 2210 can set a NAV or until a period equal to a predefined delay has transpired, whichever is earlier.

In some implementations, processor 2212 may perform additional operations. For instance, processor 2212 may transmit, via transceiver 2216, a first PPDU, with the first PPDU containing a request for apparatus 2220 to trigger UL transmissions on the secondary link. Additionally, processor 2212 may receive, via transceiver 2216, a control frame (e.g., ML-BA) on the primary link and the secondary link to solicit synchronous UL transmissions on the primary link and the secondary link responsive to transmitting the first PPDU. Moreover, processor 2212 may transmit, via transceiver 2216, one or more additional PPDUs on the primary link and the secondary link responsive to receiving the control frame. Furthermore, processor 2212 may receive, via transceiver 2216, BAs, each for a respective one of the one or more additional PPDUs, on the primary link and the secondary link responsive to transmitting the one or more additional PPDUs.

In some implementations, processor 2212 may perform additional operations. For instance, processor 2212 may receive, via transceiver 2216, a multi-link UL trigger on the primary link, with the multi-link UL trigger containing a link ID bitmap indicating that at least one link of the plurality of links is triggered. Moreover, processor 2212 may transmit, via transceiver 2216, one or more PPDUs on the at least one link that is triggered.

In some implementations, processor 2212 may perform additional operations. For instance, processor 2212 may receive, via transceiver 2216, a configuration from the AP (e.g., apparatus 2220 as AP 120) configuring the primary link and the secondary link such that: (a) contention by the one or more STAs on the primary link by EDCA channel contention is allowed for DL and UL transmissions, and (b) contention by the one or more STAs on the secondary link by EDCA channel contention is allowed for the AP to trigger UL transmissions except that, as indicated by the AP that no DL transmission is allowed on the primary link for a period of time, EDCA channel contention on the secondary link by the one or more STAs is allowed. Moreover, processor 2212 may perform, via transceiver 2216, an EDCA backoff procedure to contend for a medium on the secondary link for an UL transmission in an event that the AP indicates no DL transmission on the primary link for the period of time.

In some implementations, processor 2212 may also receive, via transceiver 2216, a configuration from the AP configuring the primary link and the secondary link such that a DL transmission on the secondary link by EDCA channel contention is allowed only together with a DL transmission on the primary link.

In some implementations, processor 2212 may perform additional operations. For instance, processor 2212 may receive, via transceiver 2216, an indication from the AP on each of a first link and a second link of the plurality of links to solicit an UL TXOP using EDCA. Additionally, processor 2212 may transmit, via transceiver 2216, a request frame on the second link responsive to receiving the indication. Moreover, processor 2212 may receive, via transceiver 2216, a response frame from the AP to result in the STA obtaining the UL TXOP on the second link in an event that there is no ongoing DL TXOP on the first link. Furthermore, processor 2212 may perform, via transceiver 2216, either or both of the following: (i) performing an UL transmission on the second link during the UL TXOP, and (ii) receiving a trigger frame from the AP that triggers UL transmissions on the first link.

Illustrative Processes

Figure 23:
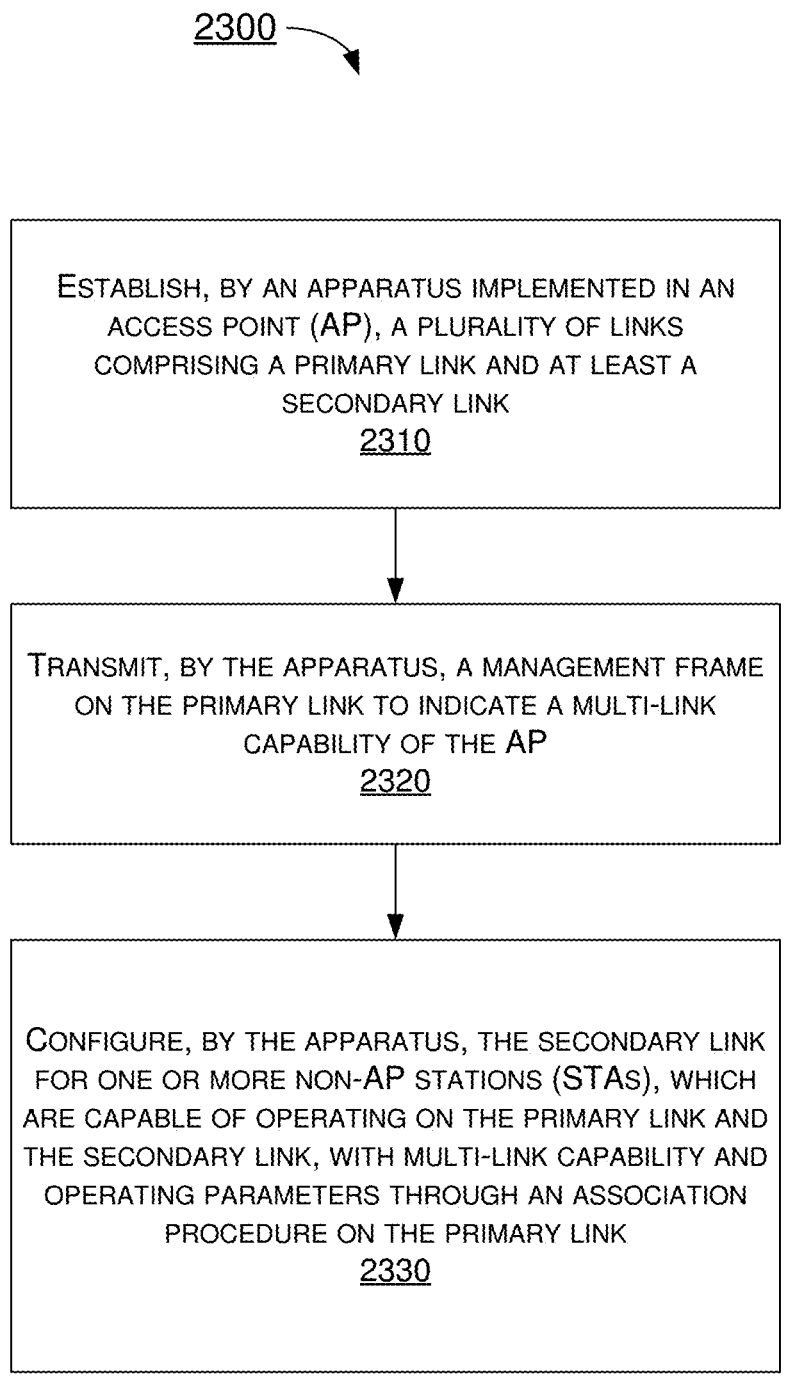
FIG. 23 is a flowchart of an example process in accordance with an implementation of the present disclosure.

FIG. 23 illustrates an example process 2300 in accordance with an implementation of the present disclosure. Process 2300 may represent an aspect of implementing various proposed designs, concepts, schemes, systems and methods described above. More specifically, process 2300 may represent an aspect of the proposed concepts and schemes pertaining to EHT multi-link channel access and operation in wireless communications in accordance with the present disclosure. Process 2300 may include one or more operations, actions, or functions as illustrated by one or more of blocks 2310, 2320 and 2330. Although illustrated as discrete blocks, various blocks of process 2300 may be divided into additional blocks, combined into fewer blocks, or eliminated, depending on the desired implementation. Moreover, the blocks/sub-blocks of process 2300 may be executed in the order shown in FIG. 23 or, alternatively in a different order. Furthermore, one or more of the blocks/sub-blocks of process 2300 may be executed repeatedly or iteratively. Process 2300 may be implemented by or in apparatus 2210 and apparatus 2220 as well as any variations thereof. Solely for illustrative purposes and without limiting the scope, process 2300 is described below in the context of apparatus 2210 implemented in or as STA 110 and apparatus 2220 implemented in or as AP 120 of a wireless network such as a WLAN in network environment 100 in accordance with one or more of IEEE 802.11 standards. Process 2300 may begin at block 2310.

At 2310, process 2300 may involve processor 2222 of apparatus 2220 establishing, via transceiver 2226, a plurality of links comprising a primary link and at least a secondary link. Process 2300 may proceed from 2310 to 2320.

At 2320, process 2300 may involve processor 2222 transmitting, via transceiver 2226, a management frame (e.g., beacon) on the primary link to indicate a multi-link capability of apparatus 2220. Process 2300 may proceed from 2320 to 2330.

At 2330, process 2300 may involve processor 2222 configuring, via transceiver 2226, the secondary link for one or more non-AP STAs (e.g., apparatus 2210 as STA 110), which are capable of operating on the primary link and the secondary link, with multi-link capability and operating parameters through an association procedure on the primary link.

In some implementations, process 2300 may also involve processor 2222 establishing the primary link and the secondary link in an event that apparatus 2220 is unable to support simultaneous transmission and reception on the primary link and the secondary link.

In some implementations, process 2300 may also involve processor 2222 allowing another one or more non-AP STAs (e.g., legacy STAs), which are not capable of multi-link operation, to be associated on the primary link but not on the secondary link.

In some implementations, process 2300 may also involve processor 2222 configuring the secondary link to be enabled for trigger-based uplink channel access and disabled for contention-based uplink channel access. In such cases, process 2300 may involve processor 2222 configuring the secondary link in an event that apparatus 2220 is unable to support simultaneous transmission and reception on the primary link and the secondary link.

In some implementations, a TXOP initiated on the primary link, as a triggering TXOP, may trigger another TXOP on the secondary link, as a triggered TXOP. In some implementations, the triggering TXOP and triggered TXOP may be synchronized. For instance, an end point of the triggered TXOP on the secondary link may be the same with or earlier than an end point of the triggering TXOP on the primary link. In some implementations, starting and end points of PPDUs on the primary link and the secondary link may be aligned with a duration of the triggered TXOP.

In some implementations, process 2300 may involve processor 2222 performing additional operations. For instance, process 2300 may involve processor 2222 triggering, via transceiver 2226, the associated one or more STAS to perform an UL transmission on the secondary link by at least one of the following: (a) directly contending a medium on the secondary link to transmit an UL trigger frame; (b) initiating by one of the one or more STAs through a trigger request indication (e.g., reverse-direction exchange indication) in an ongoing PPDU on the primary link; and (c) multi-link acknowledgement with trigger information on the primary link or on both the primary link and the secondary link.

In some implementations, process 2300 may involve processor 2222 performing additional operations. For instance, process 2300 may involve processor 2222 receiving, via transceiver 2226, a first PPDU from apparatus 2210 as a first STA (e.g., STA 110) of one or more STAs on the primary link, with the first PPDU containing a request for the AP to trigger UL transmissions on the secondary link. Moreover, process 2300 may involve processor 2222 transmitting, via transceiver 2226, a control frame (e.g., ML-BA) with trigger information on the primary link and the secondary link soliciting synchronous UL transmissions on the primary link and the secondary link responsive to receiving the first PPDU. Additionally, process 2300 may involve processor 2222 receiving, via transceiver 2226, additional PPDUs from apparatus 2210 or from apparatus 2210 and at least a second STA of the associated one or more STAs on the primary link and the secondary link responsive to transmitting the control frame. Furthermore, process 2300 may involve processor 2222 transmitting, via transceiver 2226, synchronous BAs, each for a respective one of the additional PPDUs, on the primary link and the secondary link responsive to receiving the additional PPDUs.

In some implementations, process 2300 may involve processor 2222 performing additional operations. For instance, process 2300 may involve processor 2222 transmitting, via transceiver 2226, a multi-link UL trigger on the primary link, with the multi-link UL trigger containing a link ID bitmap indicating that at least one link of the plurality of links is triggered. Additionally, process 2300 may involve processor 2222 receiving, via transceiver 2226, one or more PPDUs from the associated one or more STAs on the at least one link that is triggered.

In some implementations, process 2300 may involve processor 2222 performing additional operations. For instance, process 2300 may involve processor 2222 configuring, via transceiver 2226, the primary link and secondary link so that: (a) contention by at least one of the one or more STAs and one or more other APs on the primary link by EDCA channel contention is allowed for DL and UL transmissions, and (b) contention by at least one of the one or more STAs and the one or more other APs on the secondary link by EDCA channel contention is allowed for apparatus 2220 to trigger UL transmissions except as indicated by apparatus 2220 as the AP. For instance, apparatus 2220 may indicate, as exception, that no DL transmission is allowed on the primary link for a period of time. Accordingly, EDCA channel contention on the secondary link by the one or more STAs may be allowed. Additionally, process 2300 may involve processor 2222 performing, via transceiver 2226, an EDCA backoff procedure to contend for a medium on the secondary link to trigger UL transmissions in an event that there is no simultaneous DL transmission on the primary link for the period of time. Moreover, process 2300 may involve processor 2222 triggering, via transceiver 2226, UL transmissions on the secondary link.

In some implementations, process 2300 may also involve processor 2222 configuring the primary link and secondary link so that a DL transmission on the secondary link by EDCA channel contention is allowed only together with a DL transmission on the primary link.

In some implementations, process 2300 may involve processor 2222 performing additional operations. For instance, process 2300 may involve processor 2222 indicating, via transceiver 2226, on each of a first link and a second link (e.g., the primary link and one of the secondary links) of the plurality of links to the one or more STAs to solicit an UL TXOP using EDCA. Additionally, process 2300 may involve processor 2222 receiving, via transceiver 2226, a request frame on the second link from a first STA (e.g., apparatus 2210 as STA 110) of the one or more STAs responsive to the indicating. Moreover, process 2300 may involve processor 2222 transmitting, via transceiver 2226, a response frame to the one of the first STA to result in the first STA obtaining the UL TXOP on the second link in an event that there is no ongoing DL TXOP on the first link. Furthermore, process 2300 may involve processor 2222 performing either of the following: (1) triggering UL transmissions on the first link using EDCA, and (2) refraining from DL transmission on the first link within a duration of the UL TXOP on the second link obtained by the first STA.

FIG. 24 illustrates an example process 2400 in accordance with an implementation of the present disclosure. Process 2400 may represent an aspect of implementing various proposed designs, concepts, schemes, systems and methods described above. More specifically, process 2400 may represent an aspect of the proposed concepts and schemes pertaining to EHT multi-link channel access and operation in wireless communications in accordance with the present disclosure. Process 2400 may include one or more operations, actions, or functions as illustrated by one or more of blocks 2410, 2420 and 2430. Although illustrated as discrete blocks, various blocks of process 2400 may be divided into additional blocks, combined into fewer blocks, or eliminated, depending on the desired implementation. Moreover, the blocks/sub-blocks of process 2400 may be executed in the order shown in FIG. 24 or, alternatively in a different order. Furthermore, one or more of the blocks/sub-blocks of process 2400 may be executed repeatedly or iteratively. Process 2400 may be implemented by or in apparatus 2210 and apparatus 2220 as well as any variations thereof. Solely for illustrative purposes and without limiting the scope, process 2400 is described below in the context of apparatus 2210 implemented in or as STA 110 and apparatus 2220 implemented in or as AP 120 of a wireless network such as a WLAN in network environment 100 in accordance with one or more of IEEE 802.11 standards. Process 2400 may begin at block 2410.

At 2410, process 2400 may involve processor 2212 of apparatus 2210 receiving, via transceiver 2216, a management frame (e.g., beacon) from apparatus 2220 as an AP (e.g., AP 120) on a primary link of a plurality of links comprising the primary link and at least a secondary link, the management frame indicating a multi-link capability of apparatus 2220 (and apparatus 2210 is capable of operating on the primary link and the secondary link). Process 2400 may proceed from 2410 to 2420.

At 2420, process 2400 may involve processor 2212 perform, via transceiver 2216, an association procedure on the primary link. Process 2400 may proceed from 2420 to 2430.

At 2430, process 2400 may involve processor 2212 receiving, via transceiver 2216, a setup configuration on the primary link from apparatus 2220 setting up the secondary link.

In some implementations, process 2400 may involve processor 2212 performing additional operations. For instance, process 2400 may involve processor 2212 performing, via transceiver 2216, one or more UL transmissions by performing operations. In some implementations, process 2400 may involve processor 2212 contending a medium on the primary link. Additionally, process 2400 may involve processor 2212 monitoring either or both of the primary link and the secondary link for a trigger.

In some implementations, process 2400 may involve processor 2212 performing additional operations. For instance, in an event that apparatus 2210 is not capable of multi-link operation, process 2400 may involve processor 2212 performing, via transceiver 2216, association on the primary link but not on the secondary link. Moreover, process 2400 may involve processor 2212 performing, via transceiver 2216, one or more UL transmissions by either or both of: (i) contending for a medium on the primary link and, and (ii) monitoring the primary link for a trigger.

In some implementations, an ongoing TXOP of an intra-BSS frame exchange on the primary link, as a triggering TXOP, may trigger another TXOP on the secondary link, as a triggered TXOP. In some implementations, the triggering TXOP and triggered TXOP may be synchronized. In some implementations, an end point of the triggered TXOP on the secondary link may be the same with or earlier than an end point of the triggering TXOP on the primary link.

In some implementations, in an event that the ongoing TXOP is initiated by apparatus 2210, apparatus 2210 may indicate a grant to apparatus 2220 for apparatus 2220 to trigger apparatus 2210 or another associated STA to perform an UL transmission on either or both of the primary link and the secondary link. Moreover, apparatus 2220 may respond to apparatus 2210 with an acknowledgement and trigger information to trigger one or more STAs associated with the AP to perform UL transmissions on either or both of the primary link and the secondary link.

In some implementations, the trigger information may be transmitted on either or both of the primary link and the secondary link. In some implementations, the trigger information may indicate at least one of the following: (a) a link ID bitmap indicating at least one of the one or more STAs to monitor the trigger on at least one link of the plurality of links that is triggered; (b) a target time for the at least one of the one or more STAs to receive the trigger; and (c) resource scheduling information or a transmission parameter, or both.

In some implementations, in an event that the ongoing TXOP is initiated by apparatus 2220, apparatus 2220 may trigger one or more associated STAs to perform UL transmissions on either or both of the primary link and the secondary link. Moreover, apparatus 2220 may trigger by transmitting trigger information on the primary link.

In some implementations, in response to receiving the trigger information from apparatus 2220, apparatus 2210 may respond with a trigger-based PPDU and a request for another trigger on the primary link and the secondary link.

In some implementations, process 2400 may involve processor 2212 performing additional operations. For instance, process 2400 may involve processor 2212 transmitting, via transceiver 2216, a request to apparatus 2220 on the primary link requesting to be triggered for UL transmissions on the secondary link. Furthermore, process 2400 may involve processor 2212 receiving, via transceiver 2216, a trigger frame addressed to apparatus 2210 on the secondary link responsive to the transmitting of the request. Moreover, process 2400 may involve processor 2212 performing, via transceiver 2216, a CCA on the secondary link responsive to receiving the trigger frame. Furthermore, process 2400 may involve processor 2212 refraining from UL transmissions on the secondary link either until a frame is detected by which apparatus 2210 can set a NAV or until a period equal to a predefined delay has transpired, whichever is earlier.

In some implementations, process 2400 may involve processor 2212 performing additional operations. For instance, process 2400 may involve processor 2212 transmitting, via transceiver 2216, a first PPDU, with the first PPDU containing a request for apparatus 2220 to trigger UL transmissions on the secondary link. Additionally, process 2400 may involve processor 2212 receiving, via transceiver 2216, a control frame (e.g., ML-BA) on the primary link and the secondary link soliciting synchronous UL transmissions on the primary link and the secondary link responsive to transmitting the first PPDU. Moreover, process 2400 may involve processor 2212 transmitting, via transceiver 2216, one or more additional PPDUs on the primary link and the secondary link responsive to receiving the control frame. Furthermore, process 2400 may involve processor 2212 receiving, via transceiver 2216, BAs, each for a respective one of the one or more additional PPDUs, on the primary link and the secondary link responsive to transmitting the one or more additional PPDUs.

In some implementations, process 2400 may involve processor 2212 performing additional operations. For instance, process 2400 may involve processor 2212 receiving, via transceiver 2216, a multi-link UL trigger on the primary link, with the multi-link UL trigger containing a link ID bitmap indicating that at least one link of the plurality of links is triggered. Moreover, process 2400 may involve processor 2212 transmitting, via transceiver 2216, one or more PPDUs on the at least one link that is triggered.

In some implementations, process 2400 may involve processor 2212 performing additional operations. For instance, process 2400 may involve processor 2212 receiving, via transceiver 2216, a configuration from the AP (e.g., apparatus 2220 as AP 120) configuring the primary link and the secondary link such that: (a) contention by the one or more STAs on the primary link by EDCA channel contention is allowed for DL and UL transmissions, and (b) contention by the one or more STAs on the secondary link by EDCA channel contention is allowed for the AP to trigger UL transmissions except that, responsive to the AP indicating that no DL transmission is allowed on the primary link for a period of time, EDCA channel contention on the secondary link by the one or more STAs is allowed. Moreover, process 2400 may involve processor 2212 performing, via transceiver 2216, an EDCA backoff procedure to contend for a medium on the secondary link for an UL transmission in an event that the AP indicates no DL transmission on the primary link for the period of time.

In some implementations, process 2400 may also involve processor 2212 receiving a configuration from the AP configuring the primary link and the secondary link such that a DL transmission on the secondary link by EDCA channel contention is allowed only together with a DL transmission on the primary link.

In some implementations, process 2400 may involve processor 2212 performing additional operations. For instance, process 2400 may involve processor 2212 receiving, via transceiver 2216, an indication from the AP on each of a first link and a second link of the plurality of links to solicit an UL TXOP using EDCA. Additionally, process 2400 may involve processor 2212 transmitting, via transceiver 2216, a request frame on the second link responsive to receiving the indication. Moreover, process 2400 may involve processor 2212 receiving, via transceiver 2216, a response frame from the AP to result in the STA obtaining the UL TXOP on the second link in an event that there is no ongoing DL TXOP on the first link. Furthermore, process 2400 may involve processor 2212 performing, via transceiver 2216, either or both of the following: (i) performing an UL transmission on the second link during the UL TXOP, and (ii) receiving a trigger frame from the AP that triggers UL transmissions on the first link.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A apparatus implementable in an access point (AP), comprising:
 a transceiver configured to communicate wirelessly; and
 a processor coupled to the transceiver and configured to perform operations comprising:
  establishing, via the transceiver, a plurality of links comprising a primary link and at least a secondary link;
  transmitting, via the transceiver, a management frame on the primary link to indicate a multi-link capability of the AP;
  configuring, via the transceiver, the secondary link for one or more non-AP stations (STAs), which are capable of operating on the primary link and the secondary link, with one or more operating parameters through an association procedure on the primary link;
  configuring, via the transceiver, the primary link and secondary link so that a transmission on the secondary link by channel contention based on the one or more operating parameters is allowed together with a transmission on the primary link;
  configuring, via the transceiver, the primary link and secondary link so that contention by at least one of the one or more STAs and one or more other APs on the primary link by channel contention is allowed for downlink (DL) and uplink (UL) transmissions; and
  triggering, by the apparatus, UL transmissions on the secondary link.

2. The apparatus of claim 1, wherein the processor is further configured to perform operations comprising:
 establishing, via the transceiver, the primary link and the secondary link in an event that the AP is unable to support simultaneous transmission and reception on the primary link and the secondary link.

3. The apparatus of claim 1, wherein the processor is further configured to perform operations comprising:
 allowing, via the transceiver, another one or more non-AP STAs, which are not capable of multi-link operation, to be associated on the primary link but not on the secondary link.

4. The apparatus of claim 1, wherein a transmit opportunity (TXOP) initiated on the primary link, as a triggering TXOP, triggers another TXOP on the secondary link, as a triggered TXOP, and wherein the triggering TXOP and triggered TXOP are synchronized.

5. The apparatus of claim 1, wherein the processor is further configured to perform operations comprising:
 configuring, via the transceiver, the primary link and secondary link so that:
  contention by at least one of the one or more STAs and the one or more other APs on the secondary link by channel contention is allowed for the AP to trigger UL transmissions except as indicated by the AP.

6. The apparatus of claim 5, wherein the processor is further configured to perform operations comprising:
 performing, via the transceiver, a backoff procedure to contend for a medium on the secondary link to trigger UL transmissions in an event that there is no simultaneous DL transmission on the primary link for the period of time.

7. A method, comprising:
 receiving, by an apparatus implemented in a station (STA), a management frame from an access point (AP) on a primary link of a plurality of links comprising the primary link and at least a secondary link, the management frame indicating a multi-link capability of the AP;
 performing, by the apparatus, an association procedure on the primary link; and
 receiving, by the apparatus which is capable of operating on the primary link and the secondary link, a setup configuration on the primary link from the AP regarding setting up the secondary link;
 transmitting, by the apparatus, a first Physical Layer Conformance Procedure (PLCP) Protocol Data Unit (PPDU), the first PPDU containing a request for the AP to trigger UL transmissions on the secondary link;
 receiving, by the apparatus, a control frame on the primary link and the secondary link responsive to transmitting the first PPDU;
 transmitting, by the apparatus, one or more additional PPDUs on the primary link and the secondary link responsive to receiving the control frame; and
 receiving, by the apparatus, block acknowledgements (BAs), each for a respective one of the one or more additional PPDUs, on the primary link and the secondary link responsive to transmitting the one or more additional PPDUs.

8. The method of claim 7, further comprising:
 performing, by the apparatus, one or more uplink (UL) transmissions by:
  contending a medium on the primary link; and
  monitoring either or both of the primary link and the secondary link for a trigger.

9. The method of claim 7, further comprising:
 performing, by the apparatus which is not capable of multi-link operation, association on the primary link but not on the secondary link; and
 performing, by the apparatus, one or more uplink (UL) transmissions by either or both of:
  contending for a medium on the primary link and;
  monitoring the primary link for a trigger.

10. The method of claim 7, wherein an ongoing transmit opportunity (TXOP) of an intra-basic service set (BSS) frame exchange on the primary link, as a triggering TXOP, triggers another TXOP on the secondary link, as a triggered TXOP, and wherein the triggering TXOP and triggered TXOP are synchronized.

11. The method of claim 7, further comprising:
 receiving, by the apparatus, a multi-link UL trigger on the primary link, the multi-link UL trigger containing a link identifier (ID) bitmap indicating that at least one link of the plurality of links is triggered; and
 transmitting, by the apparatus, one or more Physical Layer Conformance Procedure (PLCP) Protocol Data Units (PPDUs) on the at least one link that is triggered.

12. The method of claim 7, further comprising:
 receiving, by the apparatus, a configuration from the AP configuring the primary link and the secondary link such that:
  contention by one or more STAs on the primary link by channel contention based on one or more operating parameters is allowed for downlink (DL) and uplink (UL) transmissions, and
  contention by the one or more STAs on the secondary link by channel contention is allowed for the AP to trigger UL transmissions except that, as indicated by the AP that no DL transmission is allowed on the primary link for a period of time, channel contention on the secondary link by the one or more STAs is allowed; and performing, by the apparatus, a backoff procedure to contend for a medium on the secondary link for an UL transmission in an event that the AP indicates no DL transmission on the primary link for the period of time.

13. The method of claim 7, further comprising:

receiving, by the apparatus, a configuration from the AP configuring the primary link and the secondary link such that a transmission on the secondary link by channel contention is allowed together with a transmission on the primary link.

14. An apparatus implementable in a station (STA), comprising:

a transceiver configured to communicate wirelessly; and a processor coupled to the transceiver and configured to perform operations comprising:

receiving, via the transceiver, a management frame from an access point (AP) on a primary link of a plurality of links comprising the primary link and at least a secondary link, the management frame indicating a multi-link capability of the AP;

performing, via the transceiver, an association procedure on the primary link;

receiving, via the transceiver, a setup configuration on the primary link from the AP regarding setting up the secondary link;

receiving, via the transceiver, a configuration from the AP configuring the primary link and the secondary link such that:

contention by one or more STAs on the primary link by channel contention is allowed for downlink (DL) and uplink (UL) transmissions, and contention by the one or more STAs on the secondary link by channel contention is allowed for the AP to trigger UL transmissions except that, as indicated by the AP that no DL transmission is allowed on the primary link for a period of time, channel contention on the secondary link by the one or more STAs is allowed; and performing, via the transceiver, a backoff procedure to contend for a medium on the secondary link for an UL transmission in an event that the AP indicates no DL transmission on the primary link for the period of time.

15. The apparatus of claim 14, wherein the processor is further configured to perform, via the transceiver, one or more uplink (UL) transmissions by:

contending a medium on the primary link; and monitoring either or both of the primary link and the secondary link for a trigger.

16. The apparatus of claim 14, wherein the processor is further configured to perform operations comprising:

performing, via the transceiver, association on the primary link but not on the secondary link; and performing, via the transceiver, one or more uplink (UL) transmissions by either or both of:

contending for a medium on the primary link and;

monitoring the primary link for a trigger.

17. The apparatus of claim 14, wherein an ongoing transmit opportunity (TXOP) of an intra-basic service set (BSS) frame exchange on the primary link, as a triggering TXOP, triggers another TXOP on the secondary link, as a triggered TXOP, and wherein the triggering TXOP and triggered TXOP are synchronized.

18. The apparatus of claim 14, wherein the processor is further configured to perform operations comprising:

receiving, via the transceiver, a configuration from the AP configuring the primary link and the secondary link such that a transmission on the secondary link by channel contention is allowed together with a transmission on the primary link.

\* \* \* \* \*